(12) United States Patent
Garcia et al.

(10) Patent No.: US 11,689,876 B2
(45) Date of Patent: *Jun. 27, 2023

(54) DYNAMICS PROCESSING EFFECT ARCHITECTURE

(71) Applicant: Google LLC, Mountain View, CA (US)

(72) Inventors: Ricardo Antonio Garcia, Mountain View, CA (US); Brian Kemler, San Francisco, CA (US); Justin Wooyoung Lee, San Francisco, CA (US); Richard Francis Lyon, Los Altos, CA (US); Malcolm Graham Slaney, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/559,307

(22) Filed: Dec. 22, 2021

(65) Prior Publication Data

US 2022/0116728 A1 Apr. 14, 2022

Related U.S. Application Data

(63) Continuation of application No. 16/862,213, filed on Apr. 29, 2020, now Pat. No. 11,234,093, which is a (Continued)

(51) Int. Cl.
*H04S 7/00* (2006.01)
*H04R 3/04* (2006.01)
*H04S 3/00* (2006.01)

(52) U.S. Cl.
CPC .............. *H04S 7/302* (2013.01); *H04R 3/04* (2013.01); *H04S 3/008* (2013.01); *H04S 2400/01* (2013.01)

(58) Field of Classification Search
CPC ........ H04R 25/00; H04R 25/30; G16H 40/40; G16H 40/63; G06F 3/165
(Continued)

(56) References Cited

U.S. PATENT DOCUMENTS

2010/0235747 A1 9/2010 Young
2015/0281853 A1* 10/2015 Eisner .................. H04R 25/505
 381/312
2016/0037279 A1* 2/2016 Borne ..................... G06F 3/165
 381/28

FOREIGN PATENT DOCUMENTS

WO 2017214086 12/2017

OTHER PUBLICATIONS

International Searching Authority, International Search Report and the Written Opinion dated Jul. 18, 2019, issued in connection with International Application No. PCT/US2019/030376, filed on May 2, 2019, 13 pages.

* cited by examiner

*Primary Examiner* — Yosef K Laekemariam
(74) *Attorney, Agent, or Firm* — McDonnell Boehnen Hulbert & Berghoff LLP

(57) ABSTRACT

A method includes providing, for each respective audio channel of a plurality of audio channels provided by an operating system of a computing device, a set of successive audio processing stages to apply to the respective audio channel. The method also includes providing, by the operating system, an application programming interface (API) configured to set a plurality of parameters for adjusting the set of successive audio processing stages for each respective audio channel. The method additionally includes receiving, via the API and from an application running on the computing device, one or more values for one or more parameters of the plurality of parameters. The method further (Continued)

includes adjusting, by the operating system, the plurality of audio channels based on the received one or more values for the one or more parameters.

20 Claims, 17 Drawing Sheets

Related U.S. Application Data continuation of application No. 16/401,264, filed on May 2, 2019, now Pat. No. 10,681,485.

(60) Provisional application No. 62/668,142, filed on May 7, 2018.
(58) Field of Classification Search
USPC .......... 381/26, 104, 106, 303, 312, 314, 317
See application file for complete search history.

```
DynamicsProcessing.Config.Builder builder =
    new DynamicsProcessing.Config.Builder(
        DynamicsProcessing.VARIANT_FAVOR_FREQUENCY_RESOLUTION,
        1 /*Example channels*/,
        true, 8,
        true, 8,
        true, 8,
        true);
Build.setPreferredFrameDuration(10); //ms Config config = builder.build();
Mbc mcb = config.getChannelByChannelIndex(0).getMbc();
for(int i = 0; i < 0; i++) {
    MbcBand mbcBand = mbc.getBand(i);
    mbcBand.setAttackTime(50);  //ms
    mbcBand.setReleaseTime(100); //ms
    mbcBand.setRatio(2.0f); //1:2.0
    mbcBand.setThreshold(-50.0f); //dBFS
    mbcBand.setKneeWidth(0); //dB
    mbc.setNoiseGateThreshold(-80.0); //dBFS
    mbc.setExpanderRatio(3.0f); //3.0:1
    mbcBand.setPreGain(0.0f); //no Pre-Gain
    mbc.setPostGain(0.0f); //no Post-Gain
}
DynamicsProcessing myDPE = new DynamicsProcessing(0 /*priority*/,
    sessionID /*sessionId from MediaPlayer, eudio track, etc*/,
    builder.build());
```

| API FUNCTIONS FOR OBTAINING MBC PARAMETERS |
| --- |
| PUBLIC FLOAT GETATTACKTIME ()  600<br>PUBLIC FLOAT GETRELEASETIME ()<br>PUBLIC FLOAT GETRATIO ()<br>PUBLIC FLOAT GETTHRESHOLD ()<br>PUBLIC FLOAT GETKNEEWIDTH ()<br>PUBLIC FLOAT GETNOISEGATETHRESHOLD ()<br>PUBLIC FLOAT GETEXPANDERRATIO ()<br>PUBLIC FLOAT GETPREGAIN ()<br>PUBLIC FLOAT GETPOSTGAIN () |

| API FUNCTIONS FOR SETTING MBC PARAMETERS |
| --- |
| PUBLIC VOID SETATTACKTIME (FLOAT ATTACKTIME)  602<br>PUBLIC VOID SETRELEASETIME (FLOAT RELEASETIME)<br>PUBLIC VOID SETRATIO (FLOAT RATIO)<br>PUBLIC VOID SETTHRESHOLD (FLOAT THRESHOLD)<br>PUBLIC VOID SETKNEEWIDTH (FLOAT KNEEWIDTH)<br>PUBLIC VOID SETNOISEGATETHRESHOLD (FLOAT NOISEGATETHRESHOLD)<br>PUBLIC VOID SETEXPANDERRATIO (FLOAT EXPANDERRATIO)<br>PUBLIC VOID SETPREGAIN (FLOAT PREGAIN)<br>PUBLIC VOID SETPOSTGAIN (FLOAT POSTGAIN) |

FIG. 6

| SMART HEARING CONTROL PARAMETERS (ONE SET FOR THE LEFT EAR, AND ONE SET FOR THE RIGHT EAR) 900 |
| --- |
| PRE-EQ BAND COUNT<br>PER BAND:<br>    BAND CUT-OFF (START AND STOP FREQUENCIES)<br>    BAND GAIN IN dB<br><br>MBC BAND COUNT<br>PER BAND:<br>    MBC BAND CUT-OFF (START AND STOP FREQUENCIES)<br>    ATTACK<br>    RELEASE<br>    RATIO N:N<br>    OTHER DYNAMIC PARAMETERS<br><br>POST-EQ BAND COUNT<br>PER BAND:<br>    BAND CUT-OFF (START AND STOP FREQUENCIES)<br>    BAND GAIN IN dB<br><br>LIMITER (BRICKWALL LIMITER)<br>    ATTACK<br>RELEASE<br>OTHER DYNAMIC PARAMETERS |

FIG. 9

DYNAMICS PROCESSING EFFECT ARCHITECTURE

CROSS-REFERENCE TO RELATED APPLICATION

This application is a continuation of and claims priority to U.S. patent application Ser. No. 16/862,213, filed Apr. 29, 2020 and titled "Dynamics Processing Effect Architecture," which claims priority to U.S. patent application Ser. No. 16/401,264, filed May 2, 2019 and titled "Dynamics Processing Effect Architecture," which claims priority to U.S. Provisional Patent Application No. 62/668,142, filed May 7, 2018 and titled "Dynamics Processing Effect Architecture," each of which is hereby incorporated by reference in its entirety as if fully set forth in this description.

BACKGROUND

The present disclosure relates generally to processing audio signals.

SUMMARY

Aspects of the subject technology relate to dynamic audio processing effects and software applications that may utilize such effects. Each audio channel provided by an operating system of a computing device is provided with a set of successive audio stages (which may be termed "audio processing stages") to apply to, or process, the audio channel (e.g., pre-EQ, multi-band compression, post-EQ, and a limiter). The operating system provides an application program interface (i.e., an application programming interface, or API, for short) to set parameters for adjusting the set of successive audio stages for each audio channel. A set of parameters for adjusting the set of successive audio stages may be received via the application program interface from an application (e.g., developed and provided by a third-party developer) running on the device. The operating system may then adjust the audio channels based on the received set of parameters. Put another way, the operating system may process the audio channels using the set of successive audio stages adjusted in dependence on the received set of parameters. In this manner, a plurality of different applications may each utilize these configurable audio channels to achieve a variety of desired audio processing effects. These applications thus do not have to separately implement any audio processing algorithms to implement the desired effects. In some examples, this may lead to reduced latency in the output of the audio. The subject technology described herein may be utilized in a number of different ways, some of which are described below, with one such use being for enhancing or compensating the hearing of a user.

Accordingly, in a first example embodiment, a computer-implemented method is provided that includes providing, for each respective audio channel of a plurality of audio channels provided by an operating system of a computing device, a set of successive audio stages to apply to the respective audio channel. The computer-implemented method also includes providing, by the operating system, an API configured to set a plurality of parameters for adjusting the set of successive audio stages for each respective audio channel. The computer-implemented method additionally includes receiving, via the API and from an application running on the computing device, one or more values for one or more parameters of the plurality of parameters. The computer-implemented method further includes adjusting, by the operating system, the plurality of audio channels based on the received one or more values for the one or more parameters.

In a second example embodiment, a computing system is provided that includes an application configured to be executed by the computing system and an operating system configured to provide a plurality of audio channels. The computing system also includes a set of successive audio stages for each respective audio channel of the plurality of audio channels to apply to the respective audio channel. The computing system further includes an API configured to (i) set a plurality of parameters for adjusting the set of successive audio stages for each respective audio channel and (ii) receive, from the application, one or more values for one or more parameters of the plurality of parameters. The operating system is configured to adjust the plurality of audio channels based on the received one or more values for the one or more parameters.

In a third example embodiment, a non-transitory computer-readable storage medium is provided having stored thereon instructions that, when executed by a computing device, cause the computing device to perform operations. The operations include providing, for each respective audio channel of a plurality of audio channels provided by an operating system of the computing device, a set of successive audio stages to apply to the respective audio channel. The operations also include providing, by the operating system, an API configured to set a plurality of parameters for adjusting the set of successive audio stages for each respective audio channel. The operations additionally include receiving, via the API and from an application executing on the computing device, one or more values for one or more parameters of the plurality of parameters. The operations further include adjusting, by the operating system, the plurality of audio channels based on the received one or more values for the one or more parameters.

In a fourth example embodiment, a system is provided that includes means for providing, for each respective audio channel of a plurality of audio channels provided by an operating system of a computing device, a set of successive audio stages to apply to the respective audio channel. The system also includes means for providing, by the operating system, an application programming interface (API) configured to set a plurality of parameters for adjusting the set of successive audio stages for each respective audio channel. The system additionally includes means for receiving, via the API and from an application running on the computing device, one or more values for one or more parameters of the plurality of parameters. The system further includes means for adjusting, by the operating system, the plurality of audio channels based on the received one or more values for the one or more parameters.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

FIG. 4 illustrates an instantation example, according to example aspects of the present disclosure.

FIG. 6 illustrates a sample list of parameter getters and setters in the MBC stage, according to example aspects of the present disclosure.

FIG. 9 illustrates a list of control parameters for a smart hearing feature, according to example aspects of the present disclosure.

DETAILED DESCRIPTION

Figure 1:
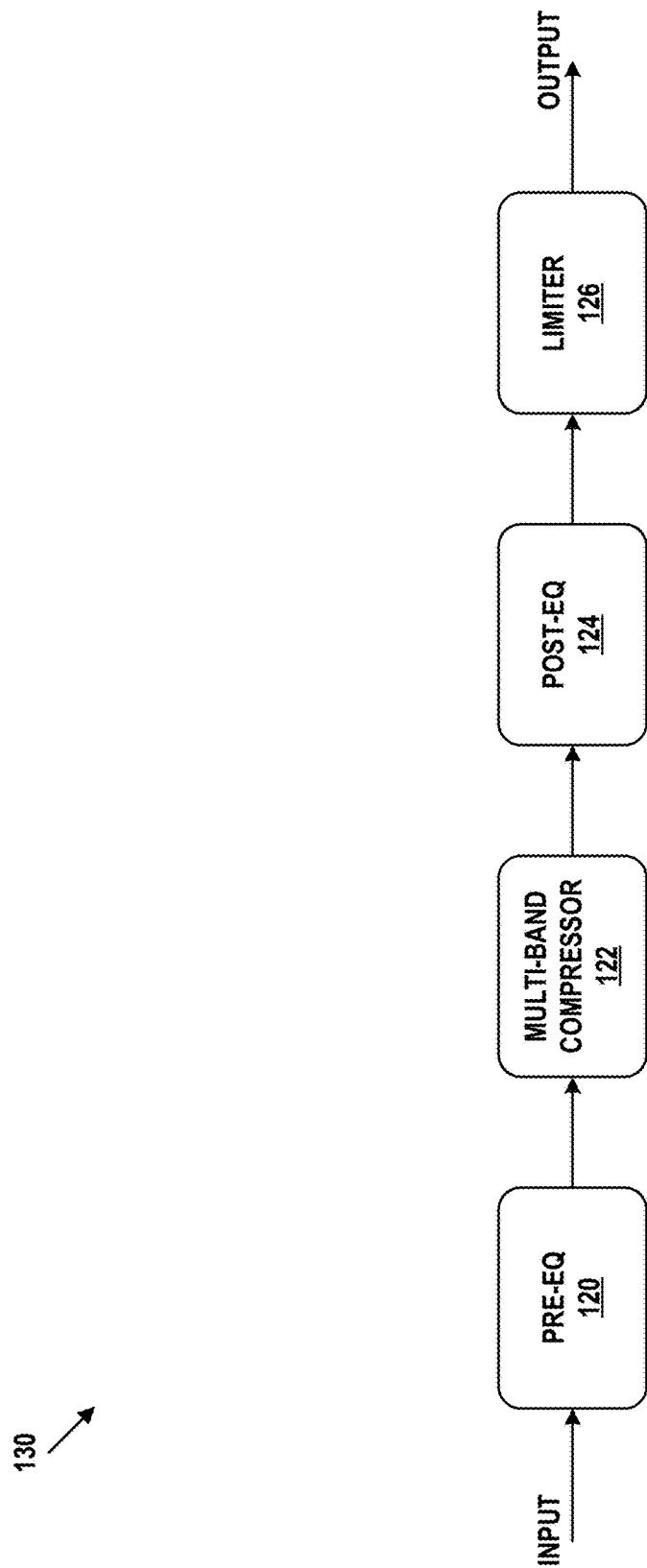
FIG. 1 illustrates a sample flexible audio processing architecture, according to example aspects of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Operating systems of computing devices, for example those targeted for mobile devices, have simple built-in audio processing effects and offer limited options to developers of applications to extend the capabilities of the built-in audio processing effects. Specifically, operating systems may be provided with audio processing architectures that are limited to a fixed number of bands (e.g., frequency bands) for equalization (EQ), a multi-band compressor (MBC), and fixed sizes and frequencies of the bands. However, utilizing the built-in audio processing effects available in the operating system platform may allow developers of applications to access certain audio data paths (e.g., telephonic audio signal path, etc.) of the computing devices that are not directly accessible to the developers for security reasons. There may be audio processing solutions that may implement similar-but-still-different enough architectures/modules using the common built-in audio processing effects that are not flexible enough for developers. Thus, in order to realize the desirable audio processing effects, the developers without the privileges of using built-in audio processing effects are required to build their own solutions that add complexity to the application designs.

In accordance with one or more implementations, methods and systems for dynamics processing effects of audio signals are herein disclosed. According to various aspects of the subject technology, a flexible audio processing architecture is built in the operating system of a computing device, and an interface (e.g., application program interface (API)) is provided for applications to configure the built-in flexible audio processing architecture and achieve desirable audio signal processing effects. That is, applications are allowed to access and configure the audio processing architecture to generate a desired audio processing chain and use this chain to process audio waveforms. Accordingly, when these applications are being developed, the applications do not have to implement independent and/or separate audio processing tools, algorithms, and/or processes. The applications may instead rely on the operating system and the API to achieve a wide range of desired audio processing effects by assigning different values to the parameters exposed by the API.

FIG. 1 illustrates a sample flexible audio processing architecture 130, according to example aspects of the present disclosure. Flexible audio processing architecture 130 may be built in an operating system of the computing device. Flexible audio processing architecture 130 and the API associated with flexible audio processing architecture 130 may describe an audio algorithm, process, and/or audio effects chain for solutions (e.g., software applications) that utilize multi-channel equalization and/or multi-band compression. Flexible audio processing architecture 130 may include a number of audio channels (e.g., K audio channels). Each audio channel may include successive audio stages. The successive audio stages may include an InputGain stage (not shown in FIG. 1), a pre-equalization (Pre-EQ) stage 120, a multi-band compressor (MBC) stage 122, a post-equalization (Post-EQ) stage 124, and a limiter stage 126.

Pre-EQ stage 120 may allow developers of applications to programmatically adjust the audio frequency, for example, from 20 Hz to 20 kHz. Pre-EQ stage 120 may additionally allow developers to adjust the balance between different frequency components present within an audio signal. MBC stage 122 may lower the loud sounds while boosting the quiet sounds without distorting the characteristics of the original audio input. Post-EQ stage 124 may fine tune the sound before the limiter stage, allowing for further adjustments to the balance between different frequency components present within the audio signal generated by MBC 122. Limiter stage 126 may prevent additional gain above a certain threshold to protect the output audio from being loud and disruptive. That is, limiter 126 may help avoid saturation, and thus distortion, of the audio signal.

In some embodiments, the InputGain stage and Pre-EQ stage 120 may be combined into one stage. The audio data may be input successively to the InputGain stage, Pre-EQ stage 120, MBC stage 122, Post-EQ stage 124, and limiter stage 126. Flexible audio processing architecture 130 provides EQ stages (e.g., Pre-EQ 120 and Post-EQ 124) before and after MBC stage 122 to allow a wide range of audio processing effect for applications. Each stage in the successive audio stages may be enabled or disabled (e.g., turned on/off). For example, an enabled stage modifies the audio signal according to parameters set by an application, and a disable stage lets the audio signal pass-through. Providing flexibility of turning on/off the individual stage, which will be discussed later in detail, may allow flexible audio processing architecture 130 to be utilized by a variety of applications.

Figure 2:
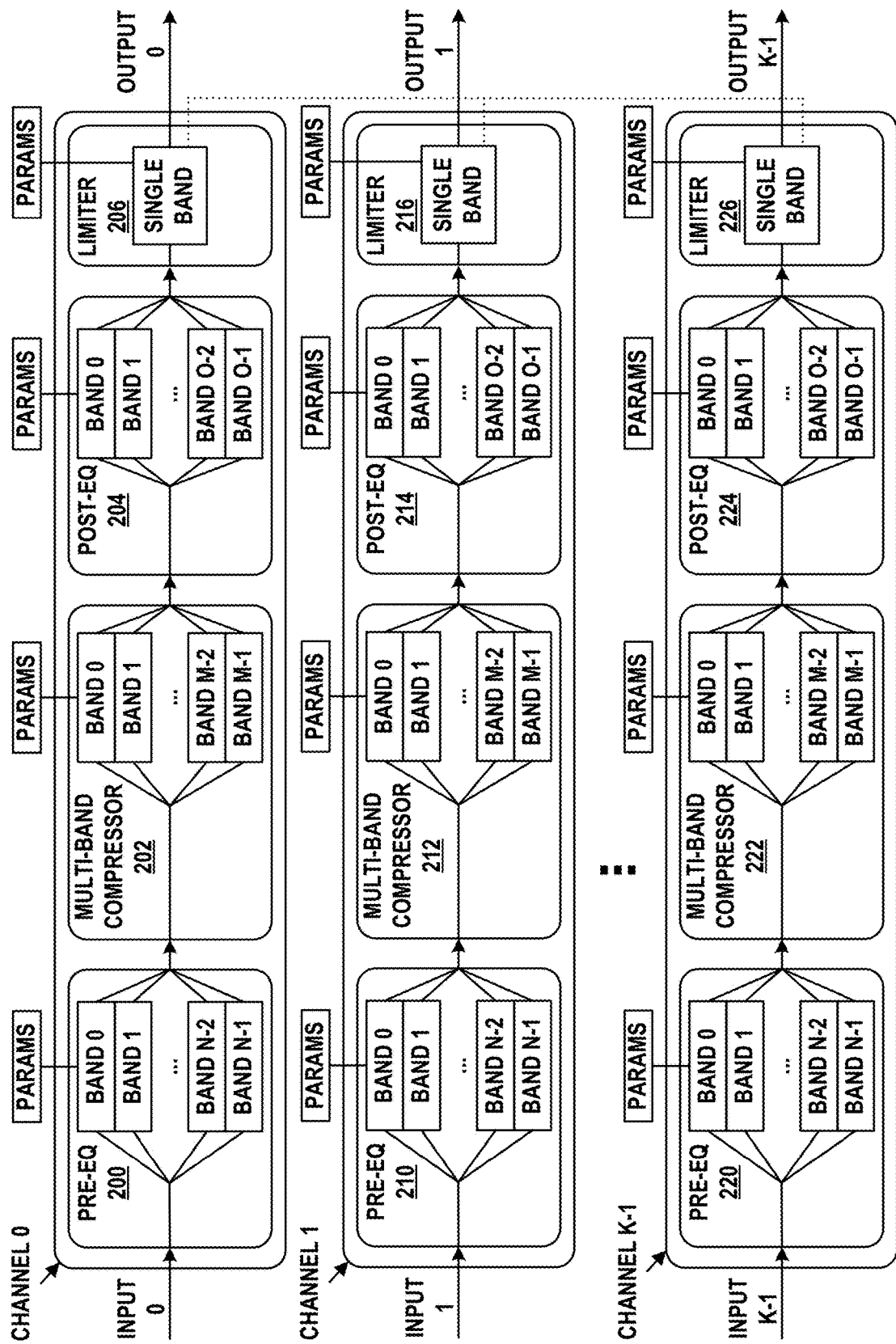
FIG. 2 illustrates a sample flexible audio processing architecture, according to example aspects of the present disclosure.

FIG. 2 illustrates a sample flexible audio processing architecture, according to example aspects of the present disclosure. Notably, the audio processing architecture of FIG. 2 includes multiple instantiations of architecture 130 shown in FIG. 1, thus forming multiple audio channels. The flexible audio processing architecture may be built or implemented in or as part of the operating system and may include a number of audio channels (e.g., Channel 0 and Channel 1 through Channel K−1) that receive audio inputs (e.g., Input 0 and Input 1 through Input K−1) from, for example, one audio source (e.g., a multi-channel audio source).

Each audio channel may include the successive audio stages illustrated in FIG. 1. Namely, Channel 0 includes pre-EQ 200, MBC 202, post-EQ 204, and limiter 206, Channel 1 includes pre-EQ 210, MBC 212, post-EQ 214, and limiter 216, and Channel K−1 includes pre-EQ 220, MBC 222, post-EQ 224, and limiter 226. The audio data is output (e.g., Output 0 and Output 1 through Output K−1) from the audio channel after being processed through the successive audio stages.

Each of the Pre EQ, MBC, and Post EQ stages may support a number of bands (e.g., Band 0, Band 1, Band M−2, Band M−1). Each channel and each stage in the channel may be configured based on parameters set, for example, by an application by way of the API. In one or more implementations, all the parameters may be changed at runtime, or only some (or none) of the parameters might be changed at runtime. Additionally, each channel and/or each stage thereof may be modifiable independently of other channels and stages. In one example, the number of bands N in the pre-EQ stage may be independently modifiable for each of Channels 0 and 1 through K−1. That is, each of pre-EQ 200, 210, and 220 may be assigned a different value for N using the parameters. Similarly, the number of bands M for the MBC stages and the number of bands 0 for the post-EQ stages may be independently modifiable for each channel by way of the parameters. Alternatively, in another example, the number of bands N in the pre-EQ stage may be the same for each of Channels 0 and 1 through K−1. That is, each of pre-EQ 200, 210, and 220 may be assigned the same value for N using the parameters. Similarly, the number of bands M for the MBC stages and the number of bands O for the post-EQ stages may be the same for each channel. Notably, the numbers of bands N, M, and O may each be assigned different values independently of one another.

Figure 3:
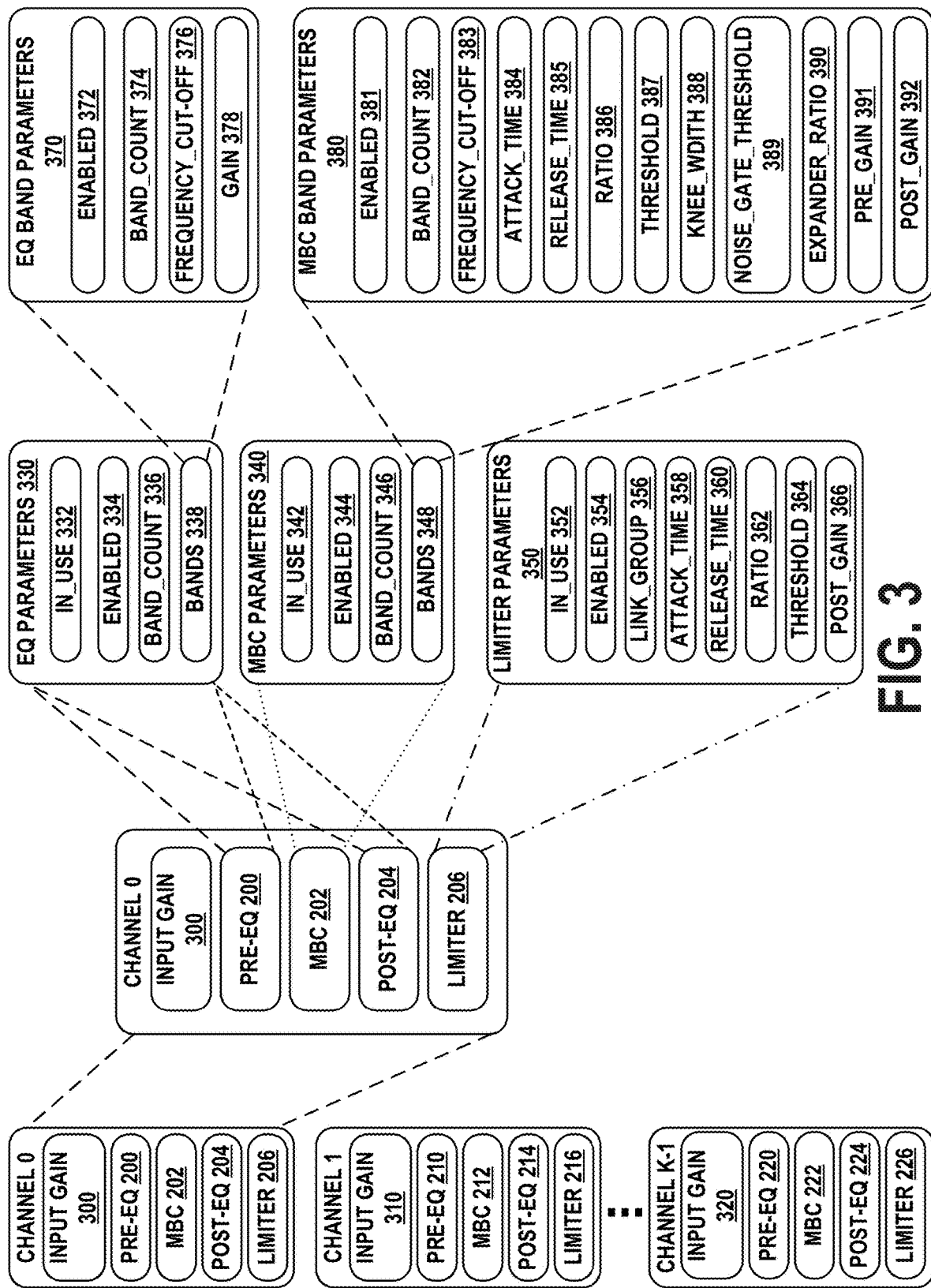
FIG. 3 illustrates a sample nested parameter structure, according to example aspects of the present disclosure.

FIG. 3 illustrates a sample nested parameter structure, according to example aspects of the present disclosure. The audio processing effects may be instantiated and controlled by a channel-based nested structure with parameters. An instantiation example according to example aspects of the present disclosure is illustrated in FIG. 4. An application program interface (API) may be provided for developers of applications by way of which the built-in flexible audio processing architecture may be configured for achieving desirable audio signal processing effects. Namely, FIG. 4 illustrates programmatic code 400 that invokes functions provided by the API to set a plurality of the parameters shown in FIG. 3. In some implementations, the details of the implementation of the API and/or the API functions may be hidden (e.g., from application developers). Accordingly, the same API may be shared among different machines, computer processing unit (CPU) architectures, and/or vendors for different implementations. That is, a uniform interface may be utilized by applications that allows implementation details of the API or its functions to be ignored by developers.

In one example, this approach may allow for Frequency Domain and/or Time Domain implementations of the effects. In some cases, the particular implementation utilized by an application may be selected and fine-tuned with some extra parameters (e.g., an additional parameter whose value determines whether the Frequency Domain or Time Domain implementation is utilized). The setPreferredFrameDuration( ) method, invoked in programmatic code 400, may be used to set a desirable frame duration (e.g., in milliseconds) and to set the effect variant to be time or frequency domain. Time domain implementation may have less algorithmic latency, but may be less flexible for specific frequency band cut-offs. Frequency domain implementations may have more latency, but may be more flexible for working with different number of bands, unexpected change of the bands, specific frequency band cut-offs, and parameters for these frequency bands. The frequency domain implementation using a short-time Fourier transform algorithm and overlap-add methods may help select an arbitrary number of bands with arbitrary cross overs to find suitable control parameters. Additional implementations may be included as required or desired.

The API allows applications to set parameters for each channel and each stage in the channel. The API is provided for applications to select a number of channels (e.g., set the value for K) utilized to process audio signal according to the number of channels required to achieve a desirable audio signal processing effect. Each monophonic channel may be treated as an independent channel. For example, a stereo signal may include two channels: zero and one, and a 5.1 surround signal may have six independent channels.

Returning to FIG. 3, each stage that supports bands (e.g., Pre-EQ 200, MBC 202, and Post-EQ 204), may include a different number of bands. Thus, EQ parameters 330 include a variable BAND_COUNT 336 for designating the number of frequency bands. The API allows the application to select a number of bands in the Pre EQ, MBC, and Post EQ stages by setting a parameter value for "BAND_COUNT" (i.e., BAND_COUNT 336 and BAND_COUNT 346) in each of the stages. In some implementations, the same type of stages may be provided with the same number of bands across each of the K channels.

Each band may have a different cutoff frequency (e.g., FREQUENCY_CUT-OFF 376, as indicated by EQ band parameters 370, and FREQUENCY_CUT-OFF 383, as specified by MBC band parameters 380) as specified by an application. The API allows the application to select the cutoff frequency for each band in the stages. Each band may be turned on/off, as indicated by variables ENABLED 372 and ENABLED 381.

Similarly, each stage may be turned on/off. The API allows the application to enable or disable any of the stages by setting a parameter for "ENABLED" in each of the stages, as indicated by variables ENABLED 334, ENABLED 344, and ENABLED 354. For example, the application may turn on/off each stage by specifying a particular value for these parameters. An enabled stage will modify the audio signal according to parameters specified by application, while a disabled stage will pass-through the audio signal without modification.

The limiter at the end of the chain on each channel may help limit the output of the sound if the sound exceeds a certain saturation threshold, thus avoiding oversaturation in the channel. For example, the API allows the application to set a saturation threshold in the limiter by setting the parameter for "THRESHOLD". The limiters from different channels are linked by a LINK GROUP parameter (represented by variable LINK GROUP 356) to allow the channels to react in a similar manner if any of the linked limiters is engaged. Namely, if any of the linked limiters is engaged, all the other linked channels are affected in the same manner. Thus, for example, when a stereo signal saturates one of the channels, the stereo image is not abruptly shifted to one channel, but remains stable by controlling all the channels based on the respective limiters in similar manner. For example, when the output of the left stereo channel in attenuated by the respective limiter to 90% of its original value, the output of the right stereo channel may also be attenuated to 90% by its limiter, thus preserving the relative amplitude between the channels.

EQ parameters 330, MBC parameters 340, and limiter parameters 350 may additionally include variables IN USE 332, IN USE 342, and IN USE 352, respectively, which may indicate whether the corresponding stage is actively being used or is configured to process audio. In some implementations, when variables IN USE 332, IN USE 342, and/or IN USE 352 indicate (e.g., at start-up of the operating system, the application, and/or the audio processing effects) that one or more of the corresponding audio stages are deactivated, the operating system may de-allocate computing resources that would otherwise be dedicated to the one or more corresponding audio stages. Limiter parameters 350 may further specify ATTACK_TIME 358, RELEASE_TIME 360, RATIO 362, THRESHOLD 364, and POST GAIN 366, each of which may further define how, for example, limiter 206 processes the audio signal. Similarly, EQ band parameters 370 of bands 338 may include BAND_COUNT 374 (e.g., 5$^{th}$ out of N bands) and GAIN 378. MBC band parameters 380 of bands 348 may include BAND_COUNT 382, ATTACK_TIME 384, RELEASE_TIME 385, RATIO 386, THRESHOLD 387, KNEEW_WIDTH 388, NOISE-_GATE_THRESHOLD 389, EXPANDER_RATIO 390, PRE-GAIN 391, and POST-GAIN 392. Further, each of Channel 0, Channel 1, and Channel K−1 may be associated with corresponding input gains 300, 310, and 320. Notably, other implementations may include more parameters or fewer parameters than illustrated in FIG. 3.

Figure 5:
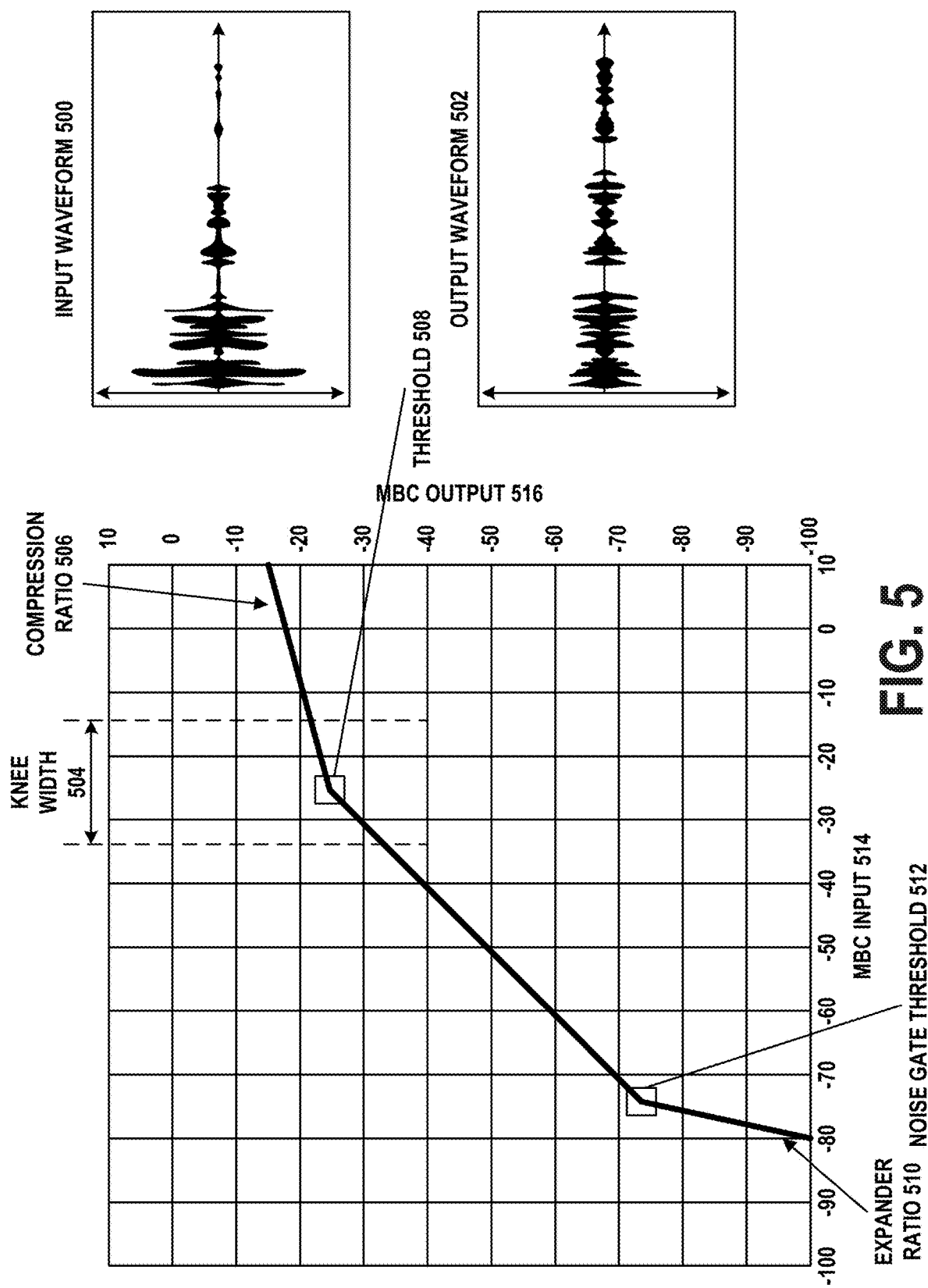
FIG. 5 illustrates a sample process of a multi-band compressor, according to example aspects of the present disclosure.

FIG. 5 illustrates a sample process of a multi-band compressor, according to example aspects of the present disclosure. Specifically, FIG. 5 graphically illustrates a transfer function of one of the frequency bands of the MBC that shows a relationship between an input of the MBC (i.e., MBC input 514 shown on the horizontal axis) and an output of the MBC (i.e., MBC output 516 shown on the vertical axis). Notably, the lower the number along the horizontal or vertical axis, the quieter the physical sound represented thereby (e.g., −10 represents a louder sound than −90). The API allows parameters to be set for the MBC stage to process audio signal input from the Pre-EQ stage and output to the Post-EQ stage. For example, as shown in FIG. 5, noise gate threshold 512, knee width 504, threshold 508, expander ratio 510, and compression ratio 506 may be specified by the parameters from the application.

FIG. 5 additionally shows input waveform 500 of the audio signal and output waveform 502 to illustrate the difference in the audio signal before the signal processing of the MBC is applied and after the signal processing of the MBC is applied, respectively. While input waveform 500 includes a portion having a relatively high amplitude (e.g., left portion thereof) and a portion having a relatively low amplitude (e.g., right portion thereof), output waveform 502 compresses and expands, respectively, these portions of input waveform 500. Thus, output waveform 502 represents a smaller range of amplitudes. Notably, the graph of FIG. 5 may correspond to a single frequency band supported by the MBC. Thus, additional similar graphs may be used to illustrate the input-output transfer functions of other frequency bands of the MBC.

Figure 7:
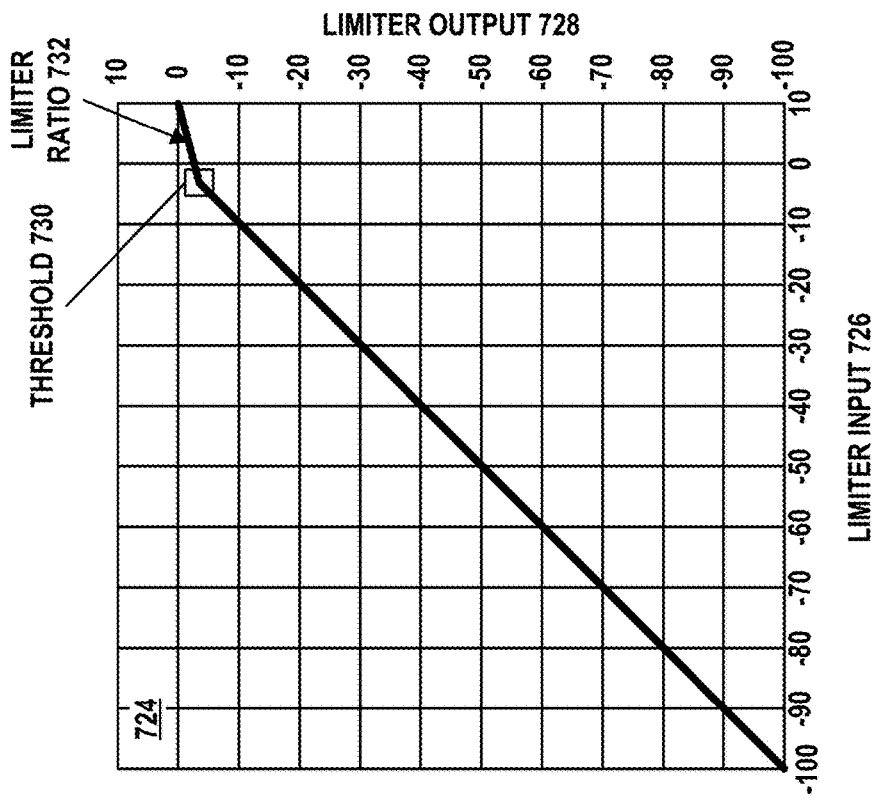
FIG. 7 illustrates a sample list of parameter getters and setters in a limiter and a sample process of the limiter stage, according to example aspects of the present disclosure.

FIG. 6 illustrates a sample list of parameter getters 600 (e.g., API functions used to obtain a current value of a parameter) and setters 602 (e.g., API functions used to modify a value of a parameter) in the MBC stage, according to example aspects of the present disclosure. Notably, parameter getters 600 and parameters setters 602 correspond to a subset of MBC band parameters 380 shown in FIG. 3. FIG. 7 illustrates a sample list of parameter getters 720 and setters 722 in the limiter stage according to example aspects of the present disclosure. Parameter getters 720 and parameters setters 722 correspond to a subset of limiter parameters 350 shown in FIG. 3. FIG. 7 also illustrates graph 724 of an example input-output transfer function of the limiter stage. Namely, graph 724 illustrates limiter input 726 on along the horizontal axis, limiter output 728 along the vertical axis, threshold 730 of the limiter stage, and limiter ratio 732 of the limiter stage.

The flexible audio processing architecture allows developers of applications to easily configure the audio processing effects to satisfy the actual signal flow required for the applications by enabling/disabling stages and configuring bands and frequency limits along with other available parameters.

In some implementations, audio for different media may be post-processed in a studio to have enhanced dynamic range and equalization depending on the distribution media. However, with the flexible audio processing architecture capable of being applied on a high resolution audio file, the dynamic ranges and equalization may be adapted to different outputs on the computing device to play back the audio file, or may be saved for further distribution of the audio file.

In some implementations, algorithms to help enhance hearing may be adapted to the flexible audio processing architecture. Using the configurable bands and multi-band compressor along with EQ for compensation, many types of hearing enhancing algorithms may be implemented. Similar configuration may be used in the flexible audio processing architecture for use of personal sound amplifiers. That is, various audio processing algorithms/processes may be generated by way of the API that are similar to those provided by hearing aids or other sound amplifiers.

In some implementations, algorithms to adapt the output level to a target level to compensate loudness may be implemented with the dynamics audio processing effects of the subject technology.

Figure 8:
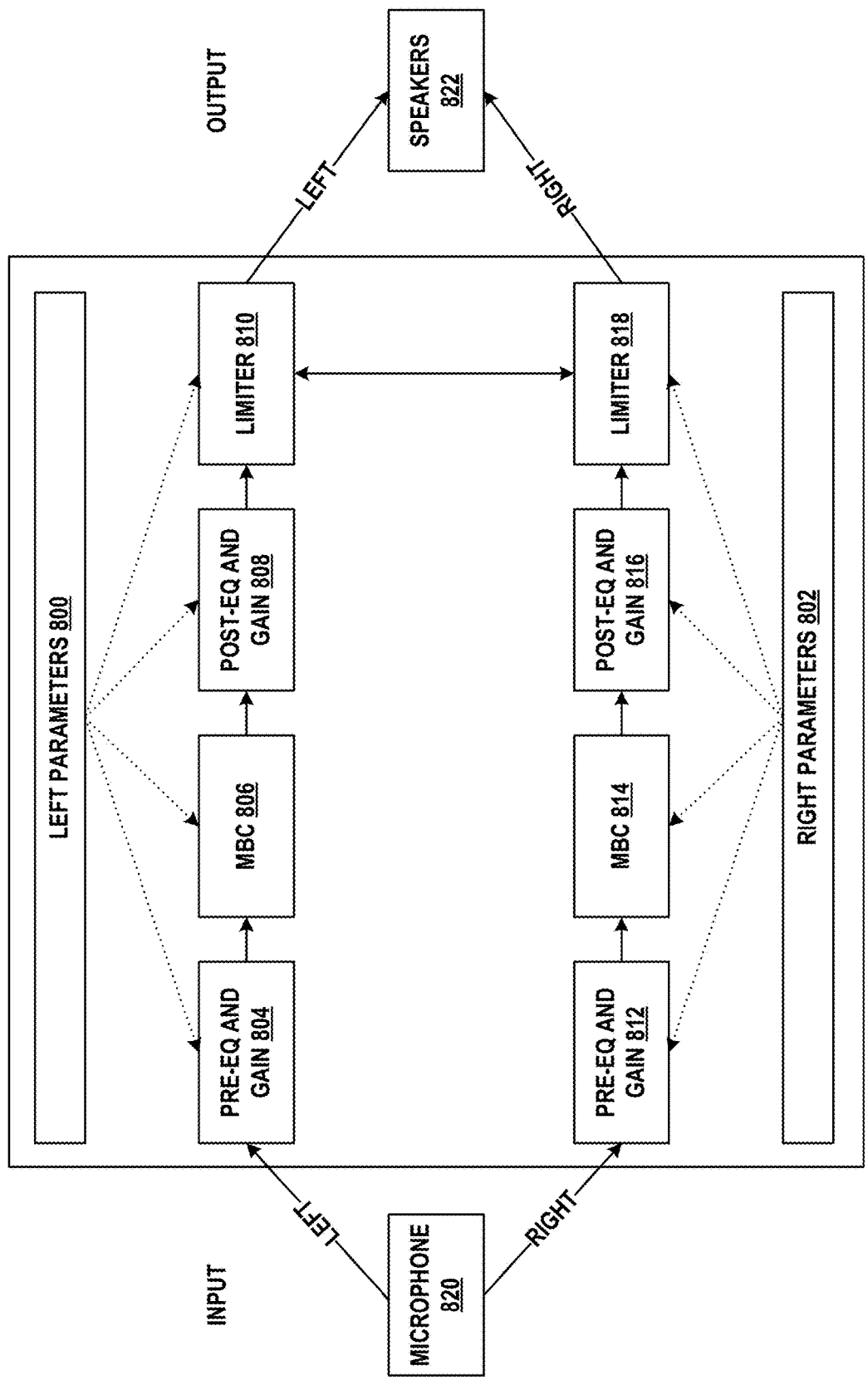
FIG. 8 illustrates an exemplary multi-channel audio processing effect, according to example aspects of the present disclosure.

FIG. 8 illustrates an exemplary multi-channel audio processing effect, according to example aspects of the present disclosure. Specifically, FIG. 8 illustrates microphone 820 configured to capture and/or generate an audio signal, left parameters 800 that specify the manner in which pre-EQ and gain 804, MBC 806, post-EQ and gain 808, and limiter 810 operate, right parameters 802 that specify the manner in which pre-EQ and gain 812, MBC 814, post-EQ and gain 816, and limiter 818 operate, and speakers 822 configured to generate an audible representation of the processed audio signal.

In one or more implementation, a computing device may include a smart hearing feature. The smart hearing feature may utilize a post processing audio effect (e.g., dynamic audio processing effects) that implements audio processing to enhance the sound using the flexible audio processing architecture. The smart hearing feature may also utilize an accessibility service that provides an accessibility service user interface (UI) screen to initiate the smart hearing feature and control the parameters and presets for the sound.

In some embodiments, the smart hearing feature may be invoked when a user enables the smart hearing feature from the accessibility menu provided by the accessibility service, when headsets or headphones (e.g., wired, wireless) are connected to the computing device, when a particular application is started on the computing device, and/or when a button or combination of buttons is pressed. The sound may be captured by the microphone of the computing device or a microphone of the headset connected to the computing device (e.g., either of which may be represented by microphone 820). The accessibility service UI screen may allow the user to control the level and overall effects and processes of the sound along with the source of the microphone.

The API for the flexible audio processing architecture allows an application (e.g., accessibility service) to individually set parameters (e.g., parameters 800 and 802) for each channel (e.g., audio channel for left ear and audio channel for right ear) to enhance or compensate the hearing of the user. For example, in compensating hearing, each ear may be treated independently with its own set of parameters for processing audio signals. The source signal (e.g., coming from a single microphone 820) may be the same for left and right ears (i.e., the left and right output of microphone 820 may be the same), but parameters are set for each ear (i.e., left parameters 800 and right parameters 802) independently to provide personalization and fine tuning of the audio signal to enhance or compensate for user's hearing.

As illustrated in FIG. 8, the source audio signal (generated, e.g., by microphone 820 connected to the computing device) may be the same for left and right channels and may be input through the flexible audio processing architecture. The left channel processes the audio signal through the successive audio stages 804, 806, and 808 in the left channel based on the parameters set by the application (i.e., left parameters 800), and the audio signal reaches limiter 810 in the left channel. The right channel processes the audio signal through the successive audio stages 812, 814, and 816 in the right channel based on the parameters (i.e., right parameters 802) set by the application, and the audio signal reaches limiter 818 in the right channel.

The limiters 810 and 818 of the left channel and the right channel, respectively, may be connected (e.g., by way of a LinkGroup parameter) to be in sync and preserve the stereo image in case one of the channels is engaged. For example, when the application sets a saturation threshold for the limiter and limiter 810 of the left channel detects that the audio signal exceeds the set threshold, limiter 818 of the right channel may be configured to limit the output of the audio signal in a similar manner as limiter 810 of the left channel. For example, when left limiter 810 attenuates an amplitude of the signal provided thereto by 15%, right limiter 818 may similarly attenuate the amplitude of the signal provided thereto by 15%. Thus, the limiters of both left and right channels may be connected to be in sync and preserve the stereo image in case one of the limiters is saturated.

FIG. 9 illustrates a list of control parameters 900 for the smart hearing feature, according to example aspects of the present disclosure. Notably, FIG. 9 illustrates a subset of the parameters illustrated in FIG. 3 selected to be modified to achieve the desired audio processing characteristic for the smart hearing feature. FIG. 9 illustrates parameters selected for each of the pre-EQ stage, the MBC stage, the post-EQ stage, and the limiter stage. Parameters not illustrated in FIG. 9 may, for example, remain set at their respective default values or values that are predetermined in other ways.

Figure 10:
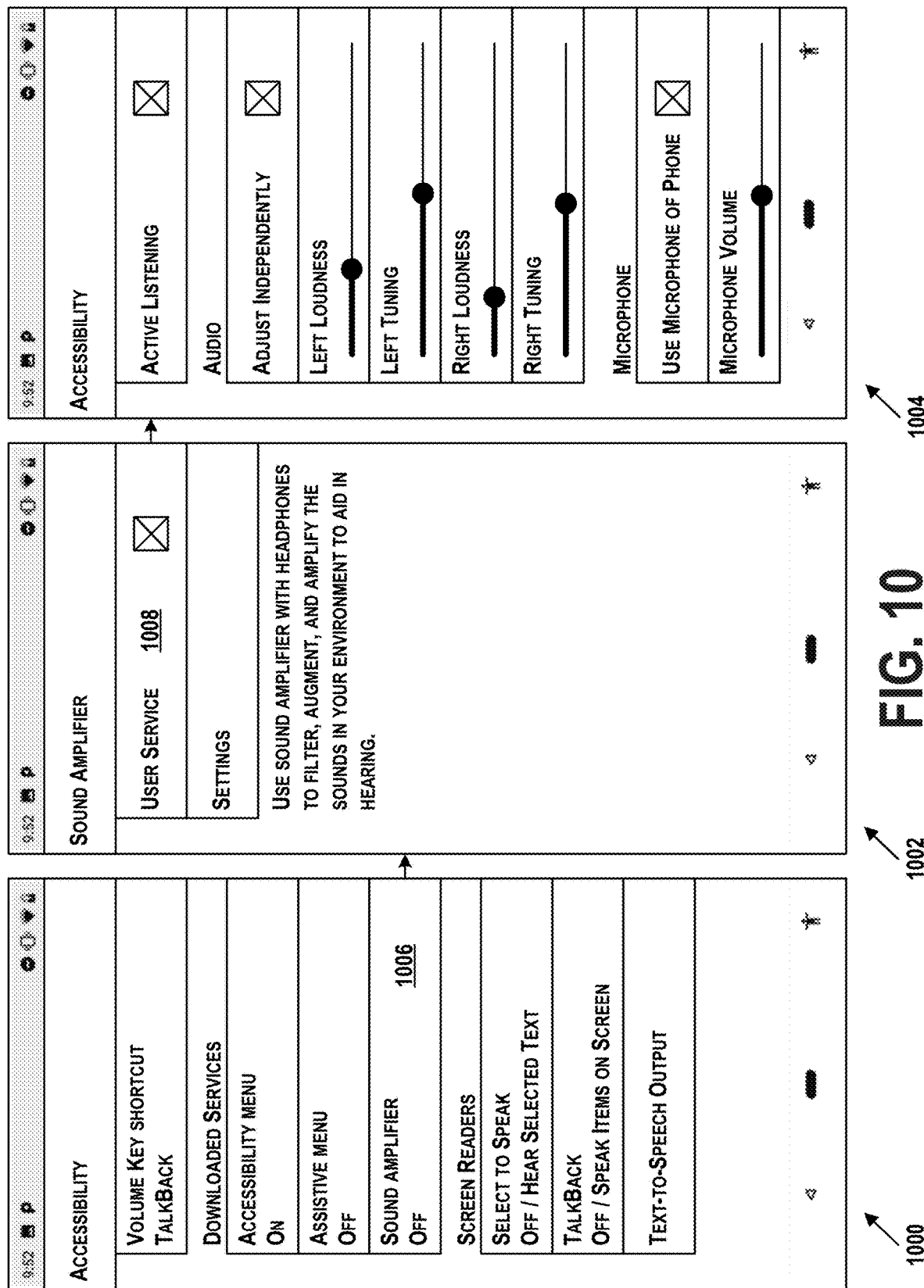
FIG. 10 illustrates sample accessibility service user interface screens, according to example aspects of the present disclosure.

FIG. 10 illustrates sample accessibility service UI screens 1000, 1002, and 1004, according to example aspects of the present disclosure. The accessibility service provided by the computing device or operating system thereof allows the computing device to improve sound. The accessibility service may allow real-time microphone input for picking up and modifying sound from the immediate environment of the computing device. Specifically, an application called, for example, "Sound Amplifier" may be used to improve the sound. As illustrated in UI 1000, this application may be enabled by way of an "Accessibility" menu provided by the operating system. Namely, when UI icon 1006 is selected, the operating system may provide UI 1002, allowing the user to enable the "Sound Amplifier" application/service by way of UI icon 1008 (e.g., by selecting the checkbox therein).

Enabling of the "Sound Amplifier" accessibility service by way of UI icon 1008 may cause the operating system to provide UI 1004 by way of which parameters of the service may be adjusted. Namely, accessibility service UI screen 1004 provided by the accessibility service may be provided with sliders (e.g., two sliders per channel, including a loudness slider and a tuning slider) that represent the parameters in simplified form, and offer intuitive manipulation of the parameters to achieve the audio signal processing effect that satisfy the users of the computing device.

Notably, the developers of applications may be able to directly utilize the API for the flexible audio processing architecture. That is, the developers may be able to directly modify any of the parameters shown in, for example, FIG. 3. However, directly controlling the parameters of the flexible audio processing architecture of the computing devices may require technical knowledge of audio signal processing. Accordingly, in some implementations, users may be presented with the UIs illustrated in FIG. 10 (e.g., UI 1004) to simplify selection of the parameters. For example, values selected by way of the "Left Loudness" slider, the "Left Tuning" slider, the "Right Loudness" slider, and the "Right Tuning" slider in UI 1004 may be mapped to the plurality of different parameters available for adjustment (e.g., as illustrated in FIG. 3).

Figure 11:
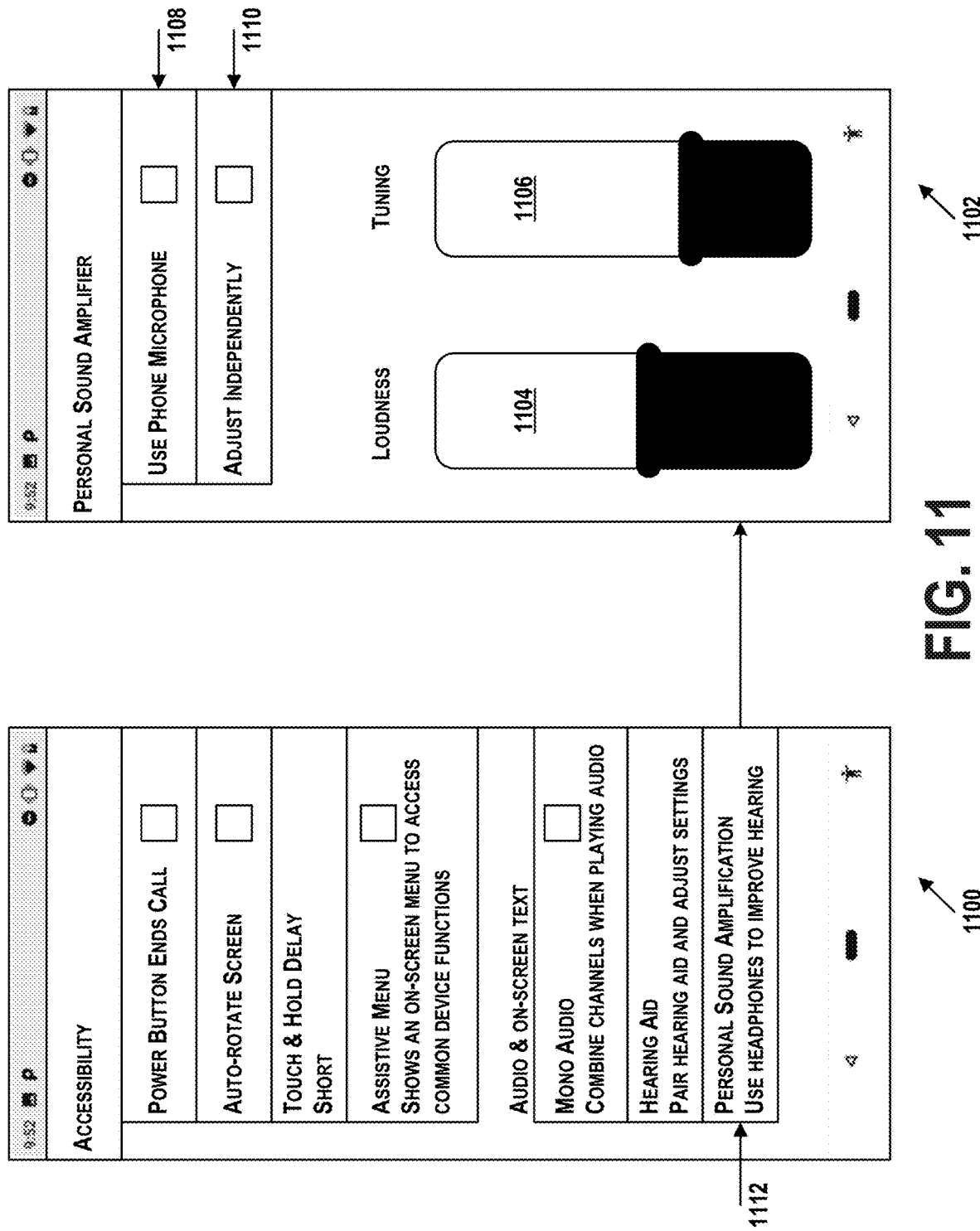
FIG. 11 illustrates sample smart hearing user interfaces, according to example aspects of the present disclosure.

FIG. 11 illustrates another sample smart hearing UIs 1100 and 1102, according to example aspects of the present disclosure. The accessibility service allows users of the computing device to access the smart hearing features, for example, by selecting icon 1112 ("Personal Sound Amplification") by way of UI 1100. Alternatively, in some embodiments, an icon may be presented on a display of the computing device (e.g., on a home screen thereof) as a shortcut to access the smart hearing features. Thus, although the accessibility service (e.g., UI 1100) may be the main access point for the smart hearing feature, a shortcut to access the accessibility service may be available for the users outside of the Accessibility menu. Selection of the shortcut and/or icon 1112 may cause the operating system to provide UI 1102 by way of which the parameters of the smart hearing feature may be modified. Notably, UI 1102 may be an alternative implementation of UI 1004.

As illustrated in FIG. 11, smart hearing UI 1102 may offer users of the computing device the ability to control audio channels for the left and right ears simultaneously. That is, by not checking the checkbox in UI element 1110, a user may indicate that the left and right channels are to be adjusted simultaneously, rather than independently as in UI 1004. In such a case, the number of sliders may be reduced from two sliders per ear, as shown in UI 1004 of FIG. 10, to a total of two sliders 1104 and 1106, as shown UI 1102 in FIG. 11. However, as shown in FIG. 10, the smart hearing UI 1004 may also allow for independent control over parameters for audio channels of the left and right ears (e.g., when the checkbox in UI element 1110 is selected). User interface 1102 may also present an option (e.g., by way of UI element 1108) for selecting whether the application is to use the built-in microphone of the computing device or a headset microphone connected to the computing device.

The accessibility service of the operating system (represented by, e.g., UIs 1000, 1002, 1004, 1100, and 1102) may utilize the API to dynamically adjust the flexible audio processing architecture. The accessibility service may detect and verify that a headphone device is connected to the computing device. When the headphone device is detected, the accessibility service may determine whether to use the microphones built in the computing device or the detected headphone device. The accessibility service may control the starting and stopping of the recording of the ambient sound through the selected microphone. The accessibility service may (e.g., based on user selection) adjust the multiple audio channels (e.g., right ear and left ear) simultaneously, or may adjust the multiple audio channels independently from each other. The accessibility service may store in a memory of the computing device the preferred parameters to be used or applied in certain circumstances (e.g., in specific locations, at particular times, etc.).

Figure 12:
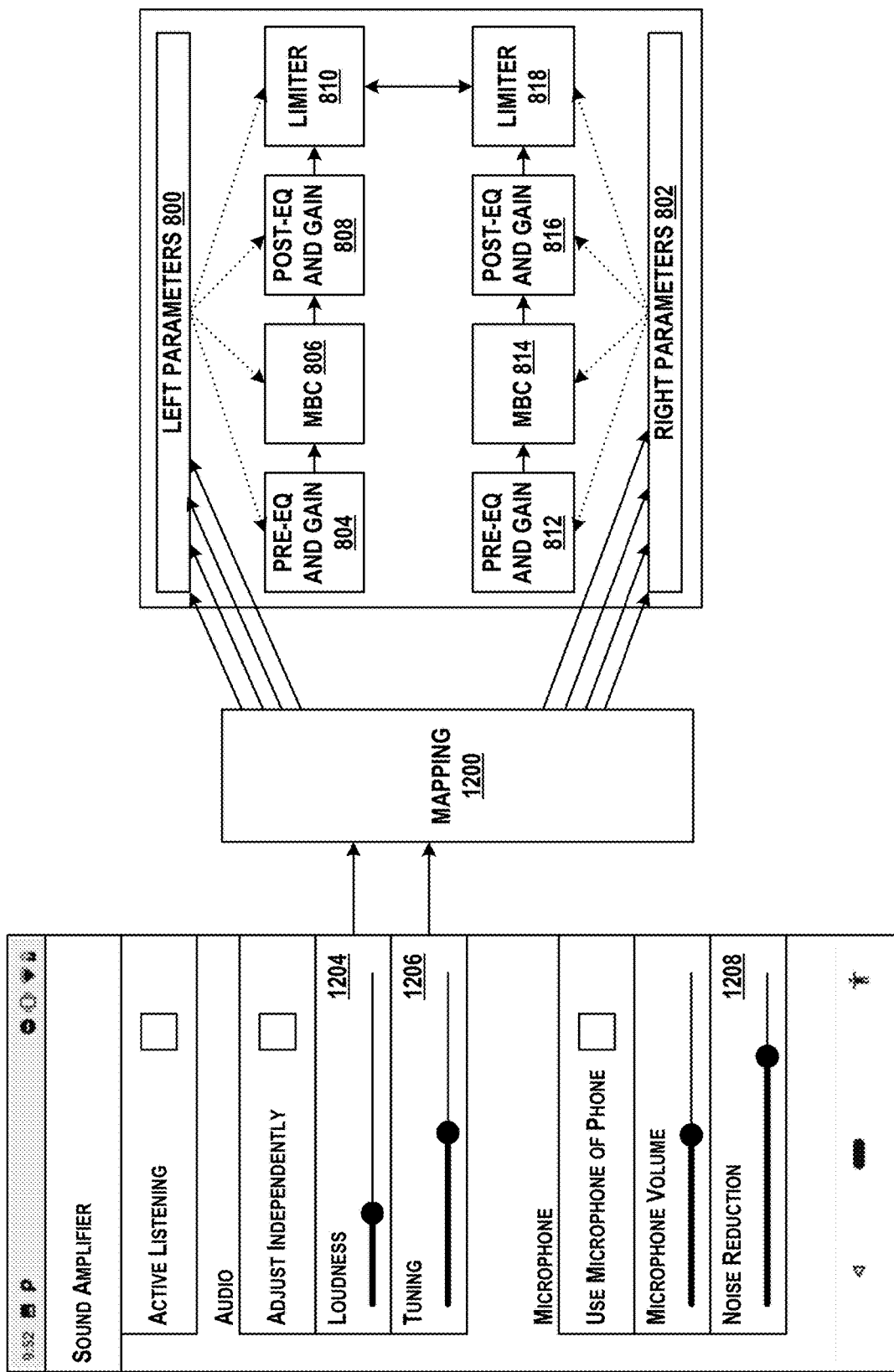
FIG. 12 illustrates a sample multi-dimensional mapping, according to example aspects of the present disclosure.

FIG. 12 illustrates a sample multi-dimensional mapping, according to example aspects of the present disclosure. Based on the parameters set through UI 1004 of FIG. 10, 1102 of FIG. 11, and/or 1202 of FIG. 12, the accessibility service may utilize the API to map the reduced parameters (e.g., the 2 or 4 parameters set by way of the sliders) provided by these UIs to all the parameters of the flexible audio processing architecture (e.g., the parameters shown in FIG. 3). For example, UI 1202 may provide the user the ability to control two audio channels (e.g., left and right) through two sliders 1204 and 1206 in UI 1202. These two sliders 1204 and 1206, however, have been reduced from (i.e., represent) over 100 parameters available in the flexible audio processing architecture. Thus, the operating system and/or the software application may utilize mapping 1200 to determine, based on the values set for one or more UI sliders (e.g., 1204 and 1206), the values for the plurality of parameters exposed by way of the API, and/or vice versa.

Thus, mapping 1200 may represent a mathematical transformation or embedding that relates values of the API parameters to values of the 2, 4, or other number of sliders (or other UI elements by way of which values can be provided) provided by way of UI 1004, 1102, and/or 1202. Notably, mapping 1200 may be configurable to accommodate a variety of possible numbers of sliders or UI elements. That is, mapping 1200 may be an R:P mapping, where R represents the number of values acquired by way of the UI, R represents the number of API parameters, and the values of P and R can vary among implementations. For example, UI 1202 illustrates an additional noise reduction slider 1208 that allows for adjustment of an extent of noise reduction applied to the audio signal by the flexible audio processing architecture. Noise reduction slider 1208 may, for example, set a noise amplitude threshold below which a signal is considered to be noise. The value set by noise reduction slider 1208 may, depending on the values of loudness 1204 and tuning 1206, affect different frequencies to different extents, as dictated by mapping 1200. Thus, the example of user UI 1202 may dictate that R is equal to three. In other examples, additional similar sliders or UI elements may be provided for adjusting other aspects of the audio signal, thus allowing for other values of R.

Figure 13A:
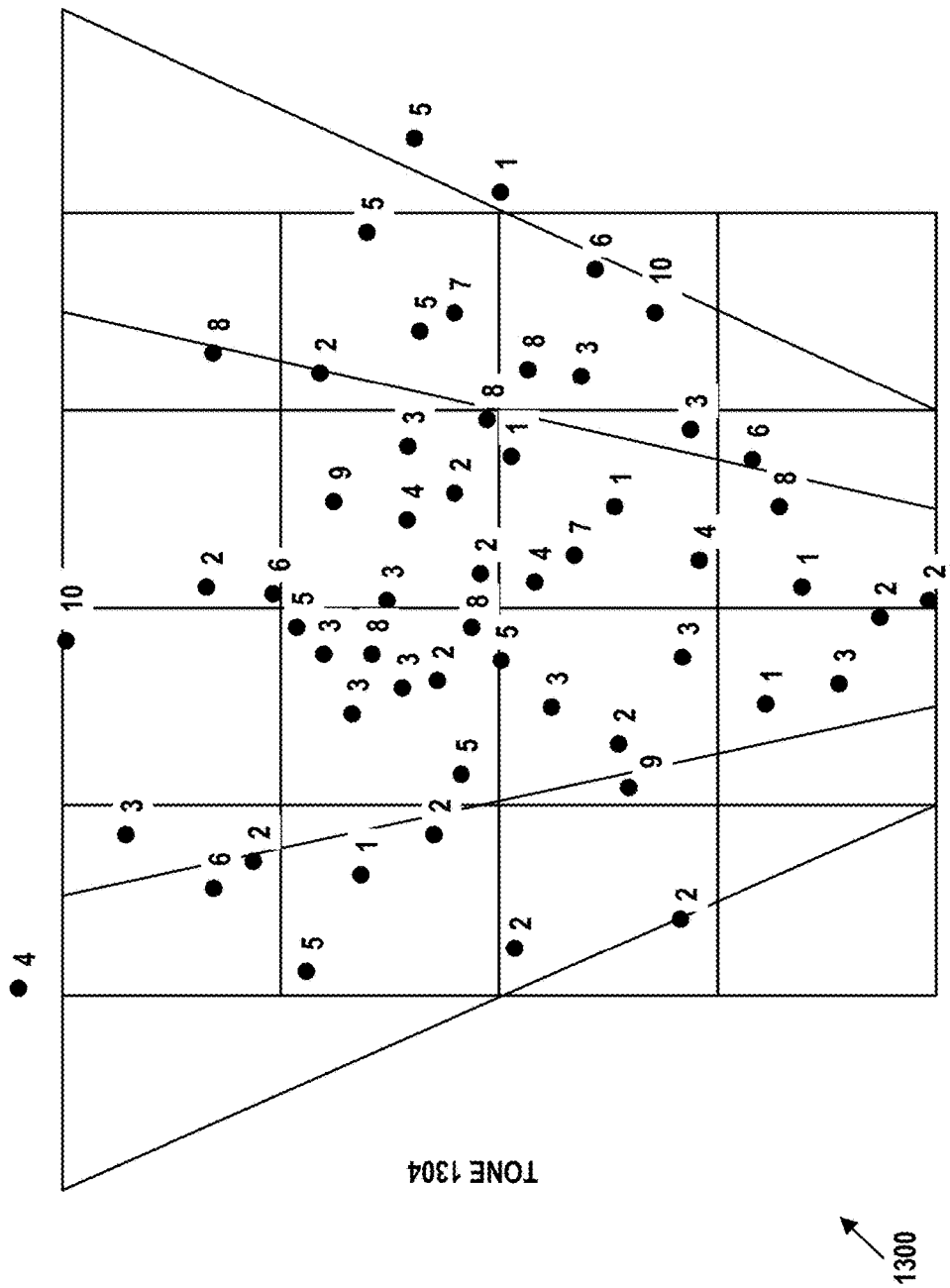
FIG. 13A and FIG. 13B illustrate a sample multi-dimensional mapping, according to example aspects of the present disclosure.

FIG. 13A illustrates a sample multi-dimensional mapping 1300, according to example aspects of the present disclosure. Specifically, mapping 1300 represents projections of various candidate combinations of values of the plurality of parameters exposed by way of the API onto a two dimensional space defined by boost 1302 and tone 1304. Notably, in some implementations, boost 1302 may correspond to the loudness set by way of UIs 1004, 1102, and/or 1202, while tone 1304 may correspond to the tone set by these UIs. Thus, each point in mapping 1300 corresponds to a particular combination of values for the audio parameters exposed by the API. By collecting a large number of such projections for a variety of different combination of parameter values, the boost-tone space may be densely populated with data points. Accordingly, when target values are specified for boost 1302 and tone 1304, these values may define a target point within mapping 1300. By finding, within mapping 1300, a point closest to the target point and determining the parameter values corresponding to this closest point, parameters to be set by way of the API may be determined. In another example, a plurality of points surrounding the target point (e.g., within a threshold distance of the target point) may be determined, and the parameter values associated with each of these points may be interpolated to determine parameters to be set by way of the API for the target point.

In some implementations, dimensionality reduction and principal component analysis may be performed to reduce the total number of parameters exposed by the API to those provided by the user interface (e.g., to determine mapping 1300), thus allowing the users to easily navigate the parameter space of the audio parameters via the UI. Notably, mapping 1300 may be one example of mapping 1200.

Figure 13B:
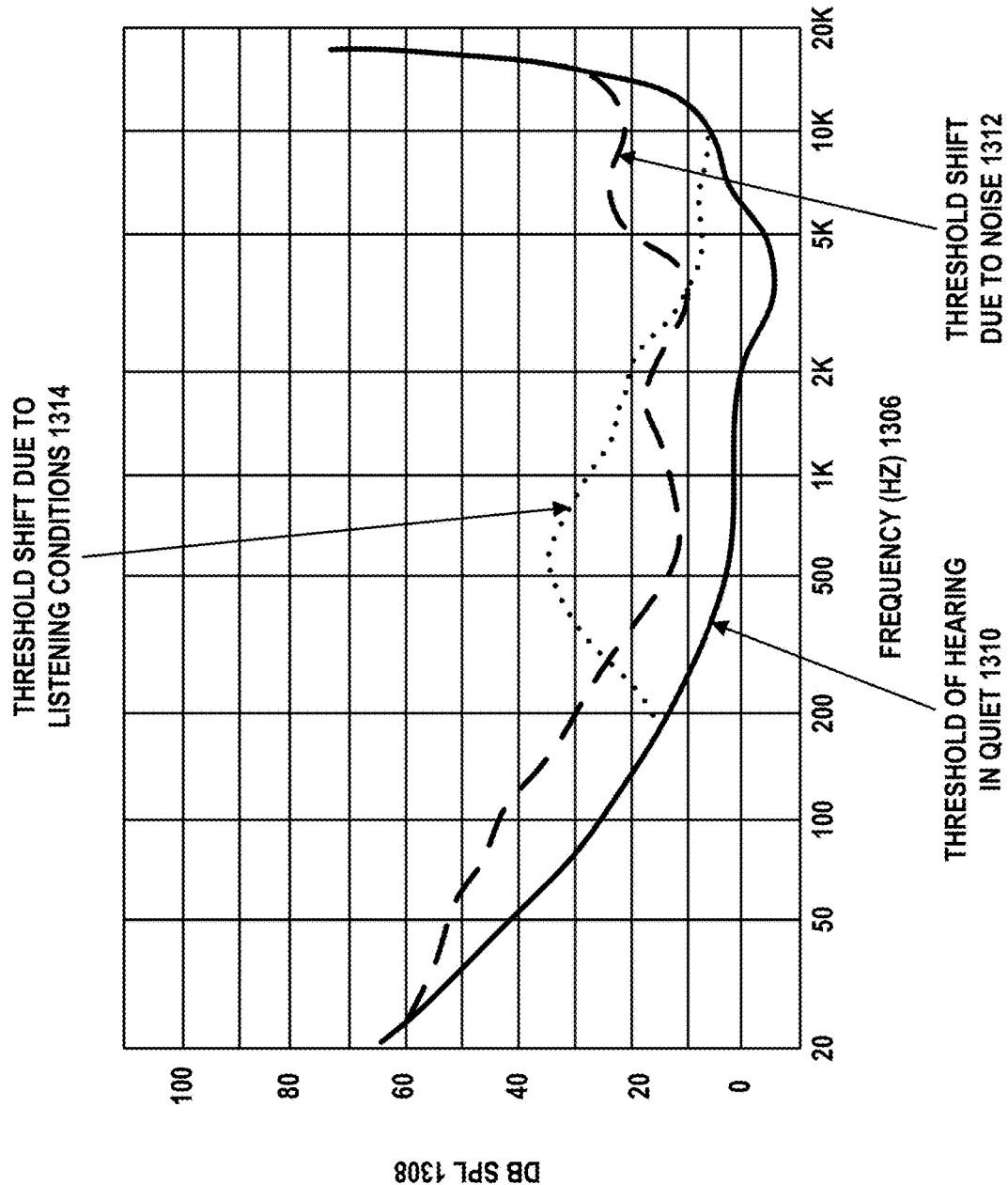

FIG. 13B illustrates results of an analysis of thresholds of hearing sounds emitted by various sources under various conditions. For example, a large collection of data related to hearing thresholds (gathered, e.g., across a plurality of different environmental noise conditions) of hearing impaired users and average/normal hearing users were analyzed. Threshold shifts (i.e., changes in minimum audible amplitude of sound having a particular frequency) that occurred based on environmental noise (e.g., restaurants, cafeterias, theaters, etc.) were analyzed along with the audio content (e.g., conversations, movie audios, music, performances, etc.) that the listeners were interested in hearing.

Specifically, FIG. 13B illustrates a graph of how audible sounds are (i.e., sound pressure level in decibels (dB SPL) 1308, represented along the vertical axis) as a function of the sound frequency (i.e., Hertz (HZ) 1306, represented along the horizontal axis). Curve 1310 illustrates a baseline threshold of hearing in a quiet environment. That is, curve 1310 indicates how loud a sound of a given frequency needs to be before it is heard by a human ear. Similarly, curve 1312 illustrates threshold shift (e.g., relative to curve 1310) of hearing in an environment that contains audible noise. Further, curve 1314 illustrates threshold shift (e.g., relative to curve 1310) of hearing due to listening conditions.

A formula to navigate the parameter space may be developed and maximized based on the analysis of the collected data. The formula allows the parameters exposed by way of the UIs in FIG. 10 and FIG. 11 to be related to the plurality of parameters exposed by the API. By taking into account the analysis shown in FIG. 13B, the parameters may be related in a frequency-dependent and ambient condition-dependent manner, such that certain frequencies are boosted to different extents depending on the listening conditions and/or noise conditions present at a given time.

Figure 14:
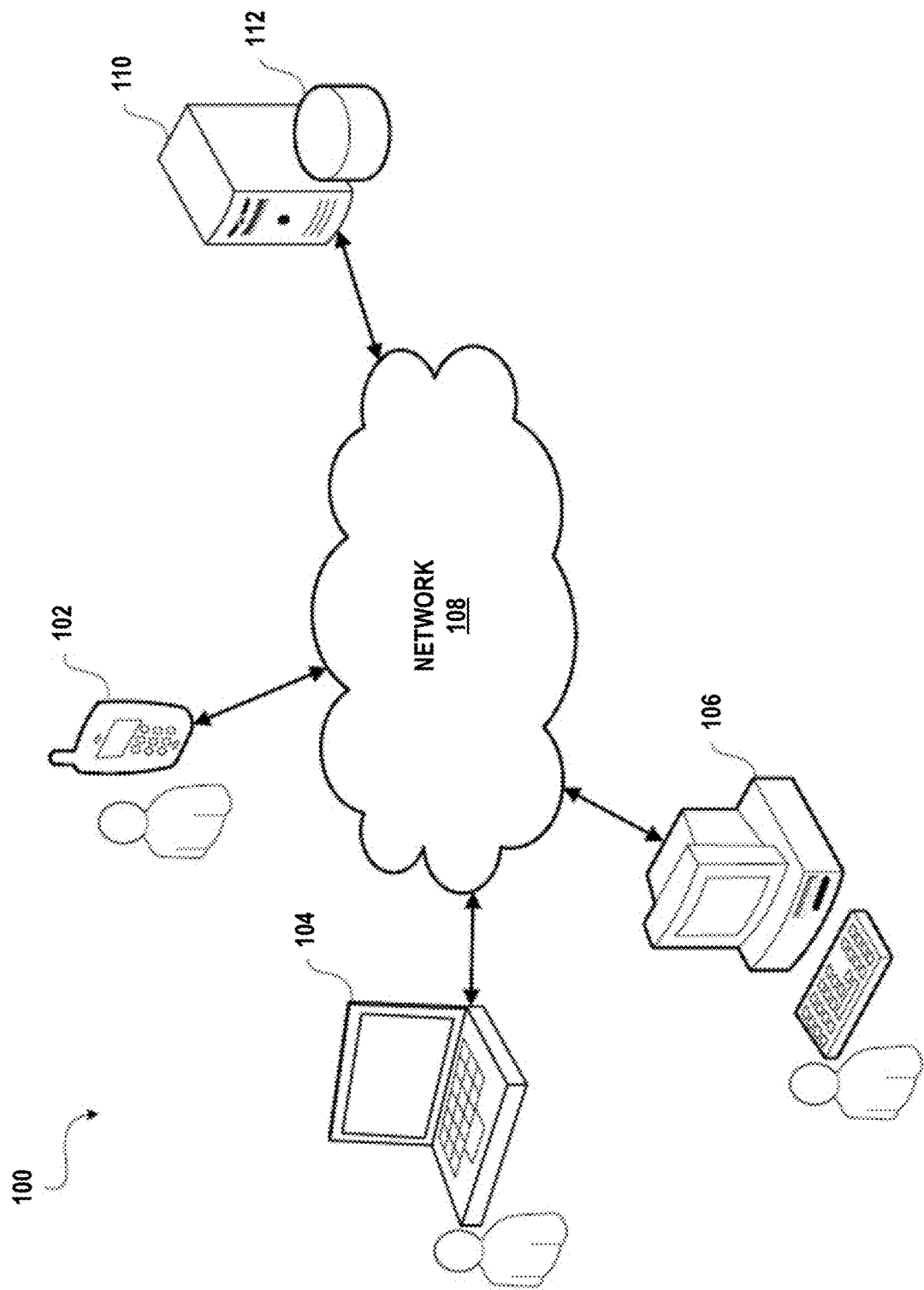
FIG. 14 illustrates an example network environment for dynamics audio processing effect, in accordance with the subject technology.

FIG. 14 illustrates an example network environment 100 for dynamics audio processing effect in accordance with the subject technology. The network environment 100 includes computing devices 102, 104, and 106, server 110, and storage 112. In some aspects, the network environment 100 can have more or fewer computing devices (e.g., 102-106) and/or server (e.g., 110) than those shown in FIG. 14.

Each of the computing devices 102, 104, and 106 can represent various forms of processing devices that have a processor, a memory, and communications capability. The computing devices 102, 104, and 106 may communicate with each other, with the server 110, and/or with other systems and devices not shown in FIG. 14. By way of non-limiting example, processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, a wired/wireless headphone/headset, a wearable device, or a combination of any of these processing devices or other processing devices.

Each of the computing devices 102, 104, and 106 may be provided with a flexible audio processing architecture and an API for application to configure the built-in flexible audio processing architecture for achieving desirable audio signal processing effects. The application may be installed on the computing devices 102, 104, and 106 as a client application. The computing devices 102, 104, and 106 may be associated with a single user. Preferred API parameters set for the flexible audio processing architecture may be transmitted to and received from server 110 via network 108.

The network 108 can be a computer network such as, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102, 104, and 106) and server (e.g., server 110) can occur via a virtual private network (VPN), Secure Shell (SSH) tunnel, Secure Socket Layer (SSL) communication, or other secure network connection. In some aspects, network 108 may further include a corporate network (e.g., intranet) and one or more wireless access points.

Server 110 may represent a single computing device such as a computer server that includes a processor and a memory. The processor may execute computer instructions stored in memory. The server 110 is configured to communicate with client applications (e.g., applications) on client devices (e.g., the computing devices 102, 104, and 106) via the network 108. For example, the server 110 may transmit the preferred API parameters received from the computing device 102 to the computing device 106 when the user switches the device from the computing device 102 to the computing device 106. In one or more implementations, the computing device 102, the computing device 104, the computing device 106, or the server 110 may be, or may include all or part of, the electronic system components that are discussed below with respect to FIG. 15.

For example, the preferred parameters may be associated with a user profile (e.g., user of the computing device 102, 104, or 106) or a device profile (e.g., computing device 102, 104, or 106). The preferred parameters associated with a user profile may be shared among various devices (e.g., computing device 102, 104, or 106) used by the user. For example, when the user switches from the first device (e.g., computing device 102) to the second device (e.g., computing device 106), the preferred parameters for a music playing application on the first device (e.g., computing device 102) may be shared from the second device (e.g., computing device 106) if the second device has the music playing application installed. In some embodiments, the preferred parameters may be shared via the server 110. The preferred parameters associated with a device (e.g., computing device 104) profile may be applied globally to applications installed on the computing device (e.g., computing device 104).

To the extent that the systems discussed herein collect personal information about users, or may make use of personal information, the users may be provided with an opportunity to control whether programs or features collect user information (e.g., information about a user's contacts, a user's preferences, or a user's current location). The users may also be provided with options to turn on or turn off certain features or functions provided by the systems. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, zip code, or state level), so that a particular location of a user cannot be determined. Thus, the user may have control over how information is collected about the user and used by the systems.

In some embodiments, when the speaker on a computing device may not accommodate low frequencies, a speaker tuning application provided through an application may utilize the flexible audio processing architecture and the API to set parameters to utilize the EQ features of the flexible audio processing architecture to compensate the lack of low frequencies of the speaker.

In some embodiments, an application may utilize the flexible audio processing architecture and the API to accommodate the ambient noise by setting the parameters for the MBC to reduce a loud noise and turning up a quiet sound.

In some embodiments, the API of the flexible audio processing architecture may have access to a database including information regarding types of speakers or microphones. Based on the types of speakers or microphones used in an application, the API may include parameters to compensate for the sound output through the speaker or picked up through the microphone. For example, when the speaker on a computing device does not accommodate low frequencies, the flexible audio processing architecture may be set to compensate the lack of low frequencies of the speaker.

In some embodiments, a microphone connected to the computing device may pick up the sound output from the computing device. Based on the sound picked up from the microphone, the flexible audio processing architecture may be adjusted to dynamically tune the sound to improve the quality of the sound.

In some embodiments, the user may set a mode so that the flexible audio processing architecture processes the audio signals such that a certain sound (e.g., explosion sounds in a movie) is reduced and a certain other sound (e.g., dialogues in a movie) is maintained or pronounced when sounds (e.g., a movie) are output through the speaker of a computing device (e.g., mobile device).

In some embodiments, operating systems of computing devices prohibit applications to directly access telephone audio data paths. Having the flexible audio processing architecture and the API built in the operating system of the computing device allows the applications to set parameters to modify the telephone audio signal without directly accessing the telephone audio data path.

In some embodiments, the subject technology of the flexible audio processing architecture built in the operating system provides for reducing latency in, for example, playing a movie on a computing device. Because the flexible audio processing architecture is provided within the operating system, the audio of the movie does not need to be enhanced in the application and transmitted to the operating system. That is, the application may transmit the audio and the necessary parameters to the flexible audio processing architecture via the API, reducing the latency to cause by the audio being processed in the application. Thus, the image and the audio of the movie synchronize.

Figure 15:
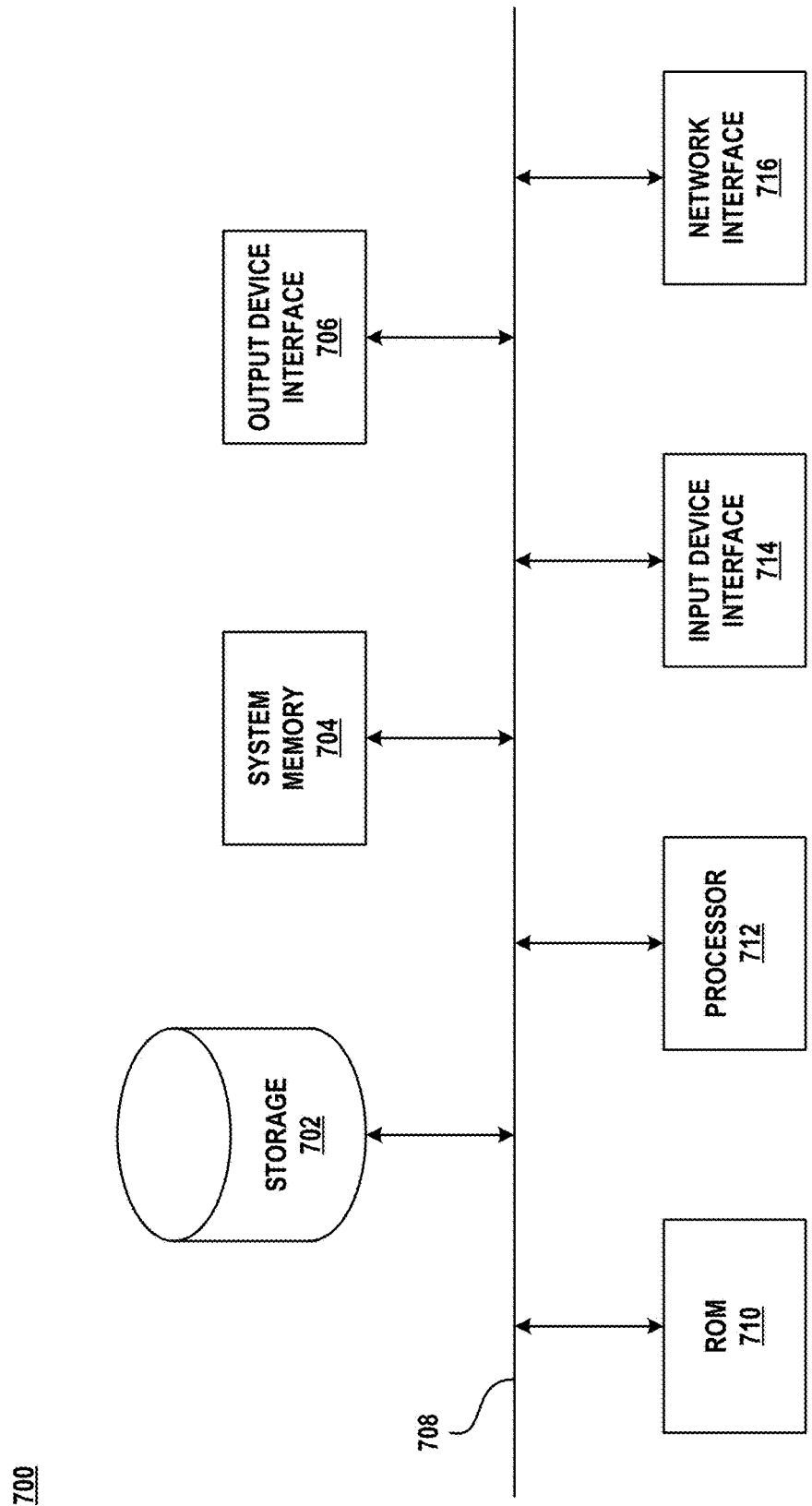
FIG. 15 conceptually illustrates an example electronic system with which some implementations of the subject technology can be implemented.

FIG. 15 conceptually illustrates an example electronic system 700 with which some implementations of the subject technology can be implemented. Electronic system 700 can be a computer, phone, personal digital assistant (PDA), or any other sort of electronic device. Such an electronic system includes various types of computer readable media and interfaces for various other types of computer readable media. Electronic system 700 includes a bus 708, processing unit(s) 712, a system memory 704, a read-only memory (ROM) 710, a permanent storage device 702, an input device interface 714, an output device interface 706, and a network interface 716.

Bus 708 collectively represents all system, peripheral, and chipset buses that communicatively connect the numerous internal devices of electronic system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. Some implementations of the subject disclosure use a mass-storage device (for example, a magnetic or optical disk, or flash memory) as permanent storage device 702.

Other implementations use a removable storage device (for example, a floppy disk, flash drive) as permanent storage device 702. Like permanent storage device 702, system memory 704 is a read-and-write memory device. However, unlike storage device 702, system memory 704 is a volatile read-and-write memory, such as a random access memory. System memory 704 stores some of the instructions and data that the processor needs at runtime. In some implementations, the processes of the subject disclosure are stored in system memory 704, permanent storage device 702, or ROM 710. For example, the various memory units include instructions for displaying graphical elements and identifiers associated with respective applications, receiving a predetermined user input to display visual representations of shortcuts associated with respective applications, and displaying the visual representations of shortcuts. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the electronic system. Input devices used with input device interface 714 include, for example, alphanumeric keyboards, pointing devices (also called "cursor control devices"), and sound capturing devices (e.g., microphones). Output device interfaces 706 enables, for example, the display of images generated by the electronic system 700. Output devices used with output device interface 706 include, for example, printers, display devices (e.g., cathode ray tubes (CRT) or liquid crystal displays (LCD)), and sound playback and/or transmission device (e.g., speakers). Some implementations include devices, for example, a touchscreen that functions as both input and output devices.

Finally, as shown in FIG. 15, bus 708 also couples electronic system 700 to a network (not shown) through a network interface 716. In this manner, the computer can be a part of a network of computers (for example, a LAN, a WAN, or an Intranet, or a network of networks, for example, the Internet). Any or all components of electronic system 700 can be used in conjunction with the subject disclosure.

Figure 16:
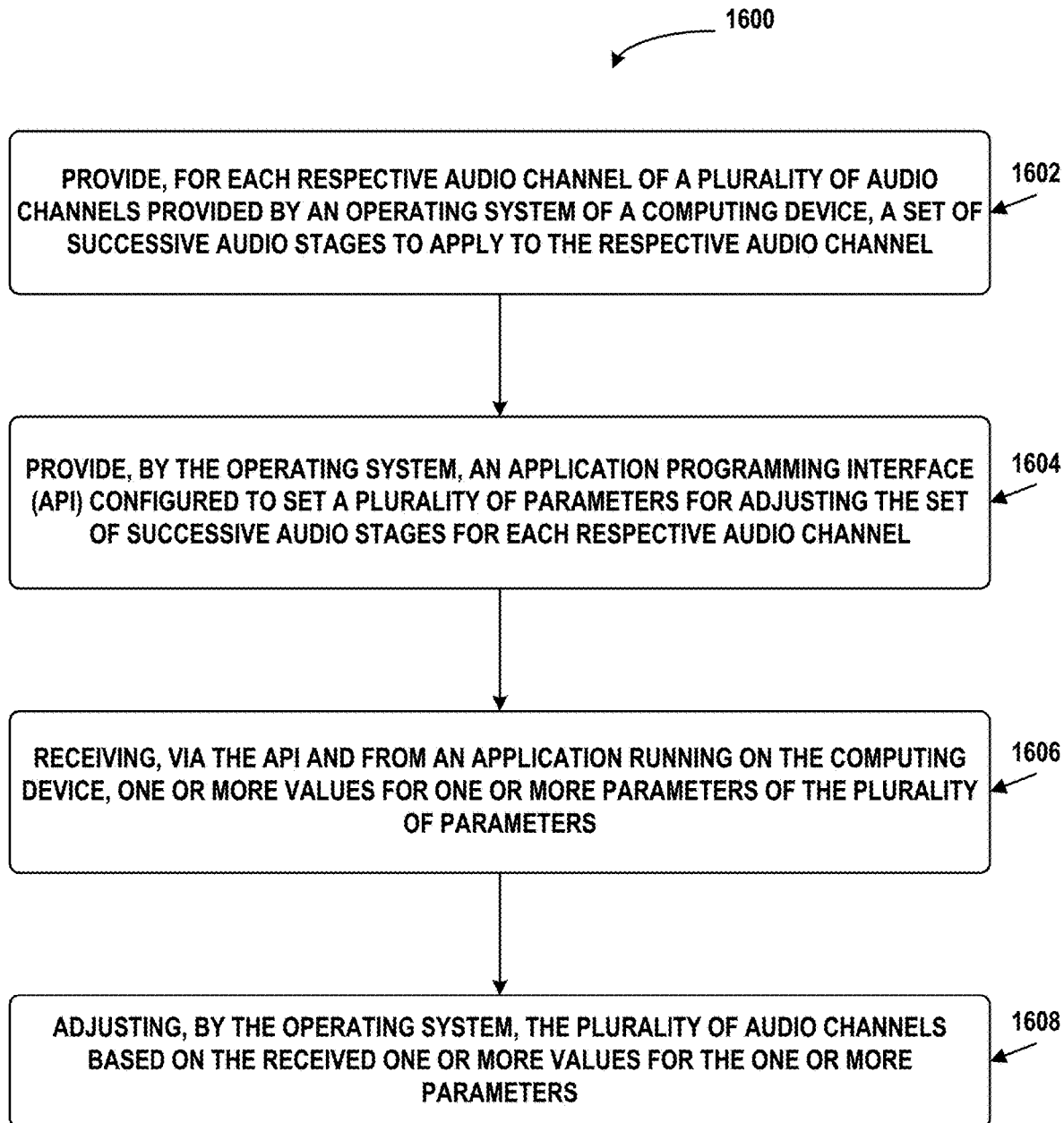
FIG. 16 illustrates a flow chart, according to example aspects of the present disclosure.

FIG. 16 illustrates flow chart 1600 of operations related to using audio processing stages provided by an operating system. The operations may be executed by and/or used with any of computing devices 102-106, electronic system 700, or other ones of the preceding example embodiments.

Block 1602 involves providing, for each respective audio channel of a plurality of audio channels provided by an operating system of a computing device, a set of successive audio stages to apply to the respective audio channel.

Block 1604 involves providing, by the operating system, an application programming interface (API) configured to set a plurality of parameters for adjusting the set of successive audio stages for each respective audio channel.

Block 1606 involves receiving, via the API and from an application running on the computing device, one or more values for one or more parameters of the plurality of parameters.

Block 1608 involves adjusting, by the operating system, the plurality of audio channels based on the received one or more values for the one or more parameters.

In some embodiments, the application may be provided by a third-party different from a provider of the operating system of the computing device.

In some embodiments, the set of successive audio stages for each respective audio channel may include one or more of: (i) an input gain stage, (ii) a pre-equalization stage, (iii) a multi-band compression stage, (iv) a post-equalization stage, or (v) a limiter stage.

In some embodiments, the plurality of parameters for adjusting the set of successive audio stages for each respective audio channel may include, for each respective audio stage of the successive audio stages, a first parameter for enabling or disabling the respective audio stage.

In some embodiments, when the respective audio stage is enabled, audio data received by the respective audio channel may be modified according to a subset of the plurality of parameters for the respective audio stage. When the respective audio stage is disabled, the audio data may be passed through the respective audio stage unmodified.

In some embodiments, a first audio stage of the set of successive audio stages may be adjustable to support a first number of frequency bands. A second audio stage of the set of successive audio stages may be adjustable to support a second number of frequency bands. The one or more values for the one or more parameters may indicate (i) a first subset of the first number of frequency bands to which to adjust the first audio stage and (ii) a second subset of the second number of frequency bands to which to adjust the second audio stage.

In some embodiments, the first number of frequency bands may be different from the second number of frequency bands.

In some embodiments, the one or more values for the one or more parameters may indicate (i) a first cut-off frequency of a first frequency band of a plurality of frequency bands supported by a first audio stage of the set of successive audio stages and (ii) a second cut-off frequency of a second frequency band of the plurality of frequency bands.

In some embodiments, the first cut-off frequency may be different from the second cut-off frequency.

In some embodiments, the set of successive audio stages for each respective audio channel may include a limiter stage. A first limiter stage of a first audio channel may be linked to a second limiter stage of a second audio channel such that, when the first limiter stage attenuates an output of the first audio channel by a first extent, the second limiter stage attenuates an output of the second audio channel by a second extent proportional to the first extent.

In some embodiments, a stereo audio signal may be defined by the first audio channel and the second audio channel.

In some embodiments, the API may provide a plurality of API functions by way of which the plurality of parameters are adjustable. Receiving the one or more values for the one or more parameters may involve receiving (i) a request for execution of one or more API functions of the plurality of API functions corresponding to the one or more parameters and (ii) the one or more values as respective inputs to the one or more API functions. Adjusting the plurality of audio channels based on the received one or more values may involve executing the one or more API functions with the one or more values as respective inputs.

In some embodiments, the API may be configured to adjust one or more additional values of one or more additional parameters of the plurality of parameters based on at least one of: (i) a type of microphone used by the application or (ii) a type of speaker used by the application.

In some embodiments, the plurality of audio channels may include a left audio channel and a right audio channel. The application may be configured to enhance a hearing of a user by receiving, from a microphone connected to the computing device, an audio signal. The application may provide the audio signal to (i) the left audio channel and (ii) the right audio channel. The audio signal may be modified by the left audio channel according to a first set of parameters of the left audio channel. The audio signal may be modified by the right audio channel according to a second set of parameters of the right audio channel. The application may receive (i) a first output of the left audio channel and (ii) a second output of the right audio channel. The application may further generate, by way of a first speaker connected to the computing device, a left output sound based on the first output, and, by way of a second speaker connected to the computing device, a right output sound based on the second output.

In some embodiments, the plurality of parameters may be a plurality of API parameters. The one or more values of the one or more parameters may be first one or more values of one or more API parameters. The application may be configured to provide a user interface by way of which a plurality of application parameters for adjusting the set of successive audio stages for each respective audio channel is adjustable. The plurality of application parameters may include fewer parameters than the plurality of API parameters. The application may receive, by way of the user interface, second one or more values for one or more application parameters of the plurality of application parameters. The application may also determine a mapping between (i) the one or more application parameters and (ii) the one or more API parameters. The application may further determine the first one or more values based on the mapping and the second one or more values.

In some embodiments, the second one or more values may be received by way of one or more sliders provided by way of the user interface.

In some embodiments, the application may be configured to determine the one or more values for the one or more parameters based on one or more of: (i) a geolocation of the computing device, (ii) noise conditions in an environment of the computing device, (iii) a time of day, (iv) user preferences associated with the computing device, or (v) output of an artificial intelligence algorithm.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, magnetic media, optical media, electronic media, etc. The computer readable media does not include carrier waves and electronic signals passing wirelessly or over wired connections.

In this specification, the term "software" is meant to include, for example, firmware residing in read-only memory or other form of electronic storage, or applications that may be stored in magnetic storage, optical, solid state, etc., which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include", "have", or the like is used in the description or the claims, such term is intended to be inclusive in a manner similar to the term "comprise" as "comprise" is interpreted when employed as a transitional word in a claim.

What is claimed is:

1. A computer-implemented method performed by a computing device comprising (i) a non-transitory computer-readable storage medium having stored thereon instructions that define an operating system and an application programming interface (API) and (ii) a processor configured to execute the instructions, the computer-implemented method comprising:
   providing, for each respective audio channel of a plurality of audio channels provided by the operating system of the computing device, a set of successive audio stages to apply to the respective audio channel;
   providing, by the operating system, the API, wherein the API is configured to assign values to a plurality of API parameters for adjusting the set of successive audio stages for the respective audio channel;
   receiving, via the API, first one or more values of one or more reduced parameters of a plurality of reduced parameters for adjusting the set of successive audio stages for the respective audio channel, wherein the plurality of reduced parameters comprises fewer parameters than the plurality of API parameters;
   determining second one or more values of one or more API parameters of the plurality of API parameters based on (i) the first one or more values and (ii) a mapping between the one or more reduced parameters and the one or more API parameters; and
   adjusting, by the operating system, the plurality of audio channels based on the second one or more values of the one or more API parameters.

2. The computer-implemented method of claim 1, further comprising:
   providing a user interface by way of which the plurality of reduced parameters is adjustable; and
   receiving, by way of the user interface, a specification of the first one or more values.

3. The computer-implemented method of claim 1, wherein the one or more reduced parameters comprise one or more of: a loudness parameter, a tuning parameter, or a noise reduction parameter, and wherein the one or more API parameters comprise one or more of: an input gain parameter, a pre-equalization parameter, a multi-band compression parameter, a post-equalization parameter, or a limiter parameter.

4. The computer-implemented method of claim 1, wherein at least one of the first one or more values of the one or more reduced parameters or the second one or more values of the one or more API parameters are based on one or more of: (i) a geolocation of the computing device, (ii) noise conditions in an environment of the computing device, (iii) a time of day, (iv) user preferences associated with the computing device, (v) an output of an artificial intelligence algorithm, (vi) a type of microphone used by the computing device or (vii) a type of speaker used by the computing device.

5. The computer-implemented method of claim 1, wherein the second one or more values of the one or more API parameters indicate (i) a first cut-off frequency of a first frequency band of a plurality of frequency bands supported by a first audio stage of the set of successive audio stages and (ii) a second cut-off frequency of a second frequency band of the plurality of frequency bands.

6. The computer-implemented method of claim 5, wherein the first cut-off frequency is different from the second cut-off frequency.

7. The computer-implemented method of claim 1, wherein the one or more API parameters comprises, for each respective audio stage of the set of successive audio stages, a particular parameter for enabling or disabling the respective audio stage, wherein, when the respective audio stage is enabled, audio data received by the respective audio channel is modified by the respective audio stage, and wherein, when the respective audio stage is disabled, the audio data is passed through the respective audio stage unmodified.

8. The computer-implemented method of claim 1, wherein the first one or more values of the one or more reduced parameters are received from a software application executed by the computing device, and wherein the second one or more values of the one or more API parameters are determined by the operating system.

9. The computer-implemented method of claim 1, wherein a first audio stage of the set of successive audio stages is adjustable to support a first number of frequency bands, wherein a second audio stage of the set of successive audio stages is adjustable to support a second number of frequency bands, and wherein the second one or more values of the one or more API parameters indicate (i) a first subset of the first number of frequency bands to which to adjust the first audio stage and (ii) a second subset of the second number of frequency bands to which to adjust the second audio stage.

10. The computer-implemented method of claim 9, wherein the first number of frequency bands is different from the second number of frequency bands.

11. A computer-implemented method performed by a computing device comprising (i) a non-transitory computer-readable storage medium having stored thereon instructions that define an operating system, an application programming interface (API), and an application and (ii) a processor configured to execute the instructions, the computer-implemented method comprising:
providing, by the operating system, (i) a plurality of audio channels comprising a first audio channel and a second audio channel and (ii) a set of successive audio stages for each respective audio channel of the plurality of audio channels to apply to the respective audio channel;
providing, by the operating system, the API, wherein the API is configured to assign values to a plurality of parameters for adjusting the set of successive audio stages for the respective audio channel;
receiving, by the API and from the application, one or more values of one or more parameters of the plurality of parameters;
adjusting, by the operating system, the plurality of audio channels based on the one or more values of the one or more parameters;
receiving, from the application and by the first audio channel and the second audio channel, an audio signal;
modifying the audio signal by the first audio channel according to a first set of parameters of the first audio channel and by the second audio channel according to a second set of parameters of the second audio channel; and
generating (i), by way of a first speaker, a first output sound based on a first output of the first audio channel and (ii), by way of a second speaker, a second output sound based on a second output of the second audio channel.

12. The computer-implemented method of claim 11, wherein the audio signal comprises a stereo audio signal that includes a left audio signal and a right audio signal, wherein the first audio channel is configured to receive the left audio signal and modify the left audio signal according to the first set of parameters, and wherein the second audio channel is configured to receive the right audio signal and modify the right audio signal according to the second set of parameters.

13. The computer-implemented method of claim 11, wherein the set of successive audio stages for the respective audio channel comprises one or more of: (i) an input gain stage, (ii) a pre-equalization stage, (iii) a multi-band compression stage, (iv) a post-equalization stage, or (v) a limiter stage.

14. The computer-implemented method of claim 11, wherein a first audio stage of the set of successive audio stages is adjustable to support a first number of frequency bands, wherein a second audio stage of the set of successive audio stages is adjustable to support a second number of frequency bands, and wherein the one or more values of the one or more parameters indicate (i) a first subset of the first number of frequency bands to which to adjust the first audio stage and (ii) a second subset of the second number of frequency bands to which to adjust the second audio stage.

15. The computer-implemented method of claim 14, wherein the first number of frequency bands is different from the second number of frequency bands.

16. The computer-implemented method of claim 11, wherein the one or more values for the one or more parameters indicate (i) a first cut-off frequency of a first frequency band of a plurality of frequency bands supported by a first audio stage of the set of successive audio stages and (ii) a second cut-off frequency of a second frequency band of the plurality of frequency bands.

17. The computer-implemented method of claim 16, wherein the first cut-off frequency is different from the second cut-off frequency.

18. The computer-implemented method of claim 11, wherein the set of successive audio stages for each respective audio channel comprises a limiter stage, wherein a first limiter stage of the first audio channel is linked to a second limiter stage of the second audio channel such that, when the first limiter stage attenuates an output of the first audio channel by a first extent, the second limiter stage attenuates an output of the second audio channel by a second extent proportional to the first extent.

19. A computing system comprising:
a processor; and
a non-transitory computer-readable storage medium having stored thereon instructions that, when executed by the processor, cause the processor to perform operations comprising:
providing, for each respective audio channel of a plurality of audio channels provided by an operating system, a set of successive audio stages to apply to the respective audio channel;
providing, by the operating system, an API configured to assign values to a plurality of API parameters for adjusting the set of successive audio stages for the respective audio channel;
receiving, via the API, first one or more values of one or more reduced parameters of a plurality of reduced parameters for adjusting the set of successive audio stages for the respective audio channel, wherein the plurality of reduced parameters comprises fewer parameters than the plurality of API parameters;
determining second one or more values of one or more API parameters of the plurality of API parameters based on (i) the first one or more values and (ii) a mapping between the one or more reduced parameters and the one or more API parameters; and
adjusting, by the operating system, the plurality of audio channels based on the second one or more values of the one or more API parameters.

20. The computing system of claim 19, wherein at least one of the first one or more values of the one or more reduced parameters or the second one or more values of the one or more API parameters are based on one or more of: (i)

a geolocation of the computing system, (ii) noise conditions in an environment of the computing system, (iii) a time of day, (iv) user preferences associated with the computing system, (v) an output of an artificial intelligence algorithm, (vi) a type of microphone used by the computing system or (vii) a type of speaker used by the computing system.

\* \* \* \* \*